(12) United States Patent
Kobayashi

(10) Patent No.: US 9,513,410 B2
(45) Date of Patent: Dec. 6, 2016

(54) IMAGING OPTICAL ELEMENT

(71) Applicant: SEIKO EPSON CORPORATION, Tokyo (JP)

(72) Inventor: Hidekazu Kobayashi, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 5 days.

(21) Appl. No.: 14/498,688

(22) Filed: Sep. 26, 2014

(65) Prior Publication Data

US 2015/0109676 A1  Apr. 23, 2015

(30) Foreign Application Priority Data

Oct. 21, 2013 (JP) .................................. 2013-218100
Mar. 28, 2014 (JP) .................................. 2014-068228

(51) Int. Cl.
*G02B 27/10* (2006.01)
*G02B 3/00* (2006.01)
*H04N 1/028* (2006.01)
*G02B 27/02* (2006.01)

(52) U.S. Cl.
CPC ............. *G02B 3/005* (2013.01); *G02B 3/0006* (2013.01); *H04N 1/02885* (2013.01); *G02B 27/021* (2013.01)

(58) Field of Classification Search
CPC .......... G02B 27/2214; G02B 27/2292; G02B 27/283; G02B 3/0062; G02B 3/0068; G02B 5/124; G09F 19/12; G09F 19/16; H01J 2229/8905; H01J 29/89
USPC .................. 359/619–624, 372–378, 319–324
See application file for complete search history.

(56) References Cited

U.S. PATENT DOCUMENTS

| 6,366,408 | B1 | 4/2002 | Kittaka et al. | |
| 2001/0021067 | A1* | 9/2001 | Masuda | B41J 2/451 359/619 |
| 2008/0273255 | A1* | 11/2008 | Yang | G02B 7/023 359/819 |
| 2012/0200899 | A1* | 8/2012 | Ogi | G02B 3/0062 358/475 |
| 2013/0021672 | A1* | 1/2013 | Yamamura | B29D 11/00298 359/619 |

FOREIGN PATENT DOCUMENTS

| JP | 60-206265 | 10/1985 |
| JP | 64-041370 | 2/1989 |
| JP | 2000-221442 | 8/2000 |
| JP | 2001-249274 | 9/2001 |
| JP | 2003-302504 | 10/2003 |

* cited by examiner

*Primary Examiner* — Scott J Sugarman
*Assistant Examiner* — Vipin Patel
(74) *Attorney, Agent, or Firm* — Workman Nydegger

(57) ABSTRACT

A CISM includes a lens array in which a plurality of lenses is arranged in a row form so that the optical axes are parallel to one another, and an incident optical image is formed from one end side in the optical axis direction of the lens array, thereby forming an image on the other end side. The CISM includes a light blocking member in which a plurality of through holes that allow light to pass through is provided in a row form in the arrangement direction. In the light blocking member, the inner wall surface of the through holes that intersects the arrangement direction includes reflection surfaces that intersect a sub-scanning direction. The reflection surfaces reflect light incident on the same reflection surface in a direction that intersects the arrangement direction.

5 Claims, 20 Drawing Sheets

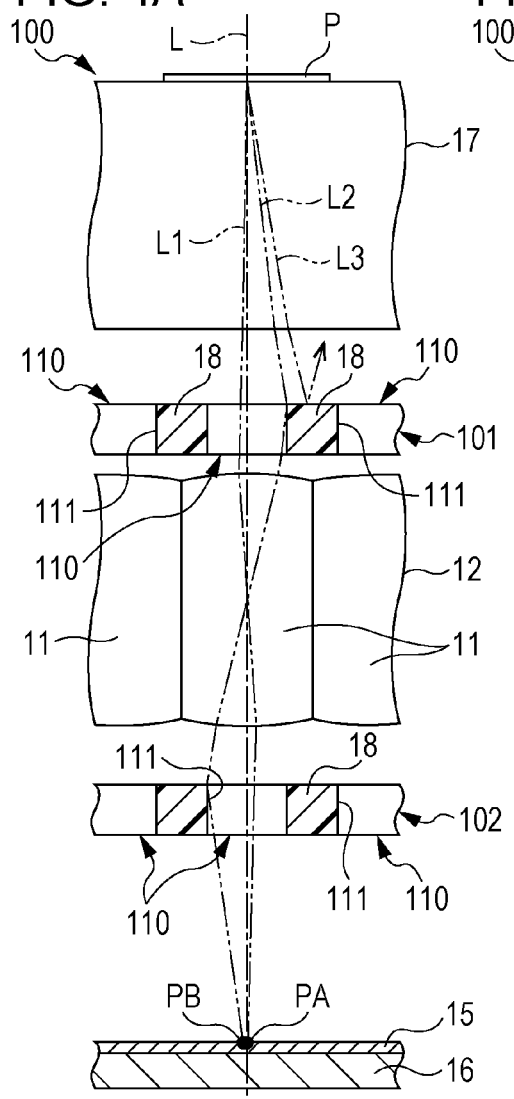
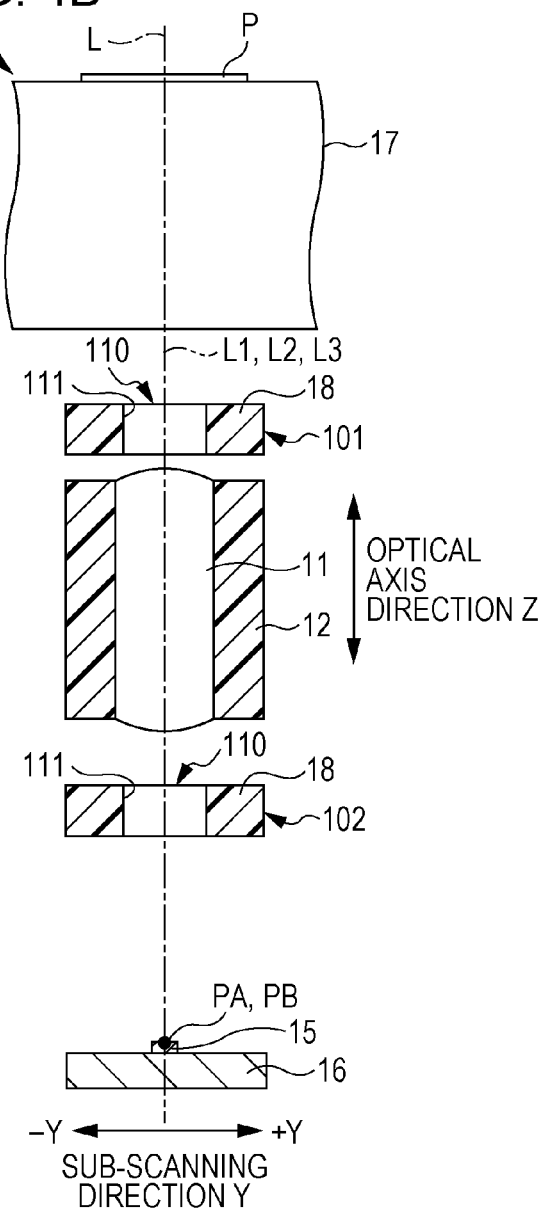
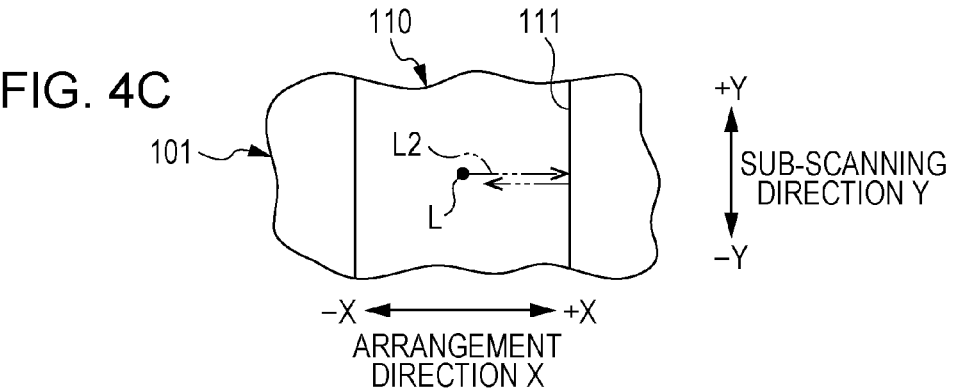

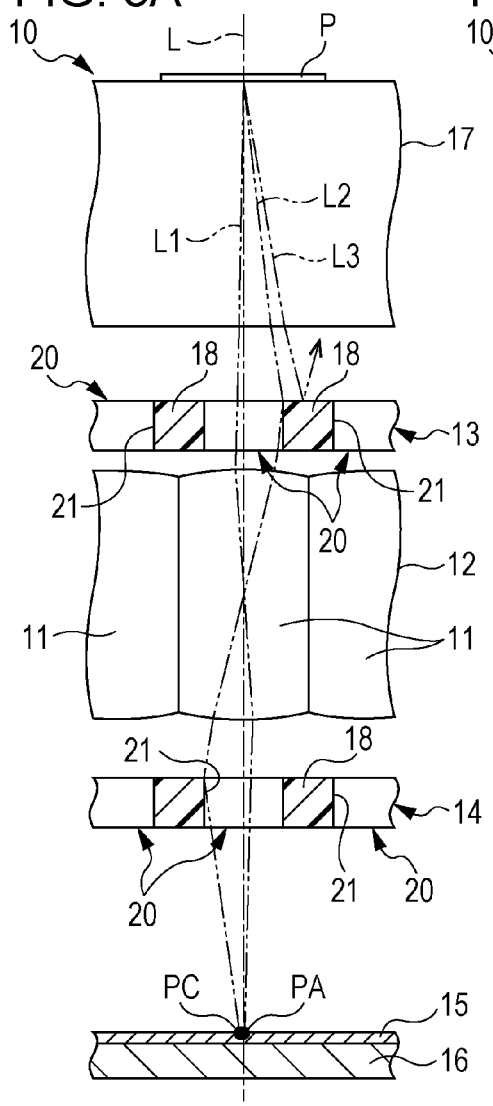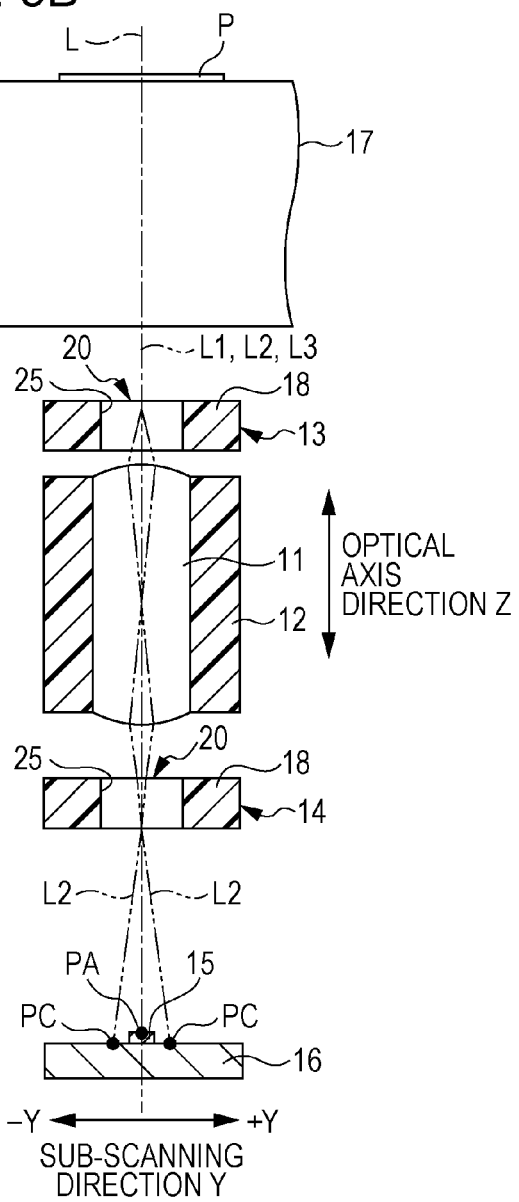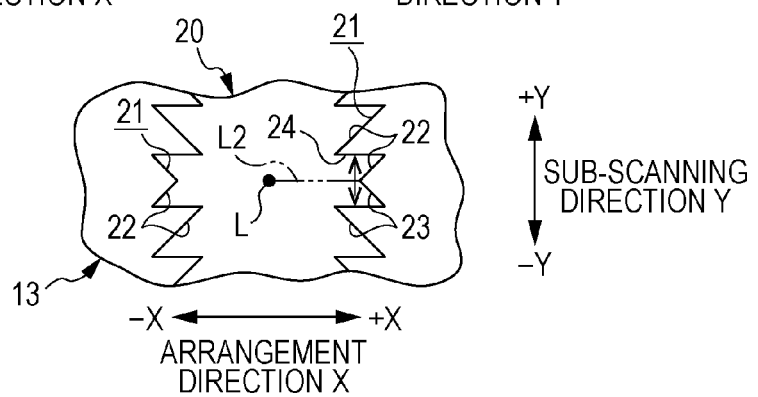

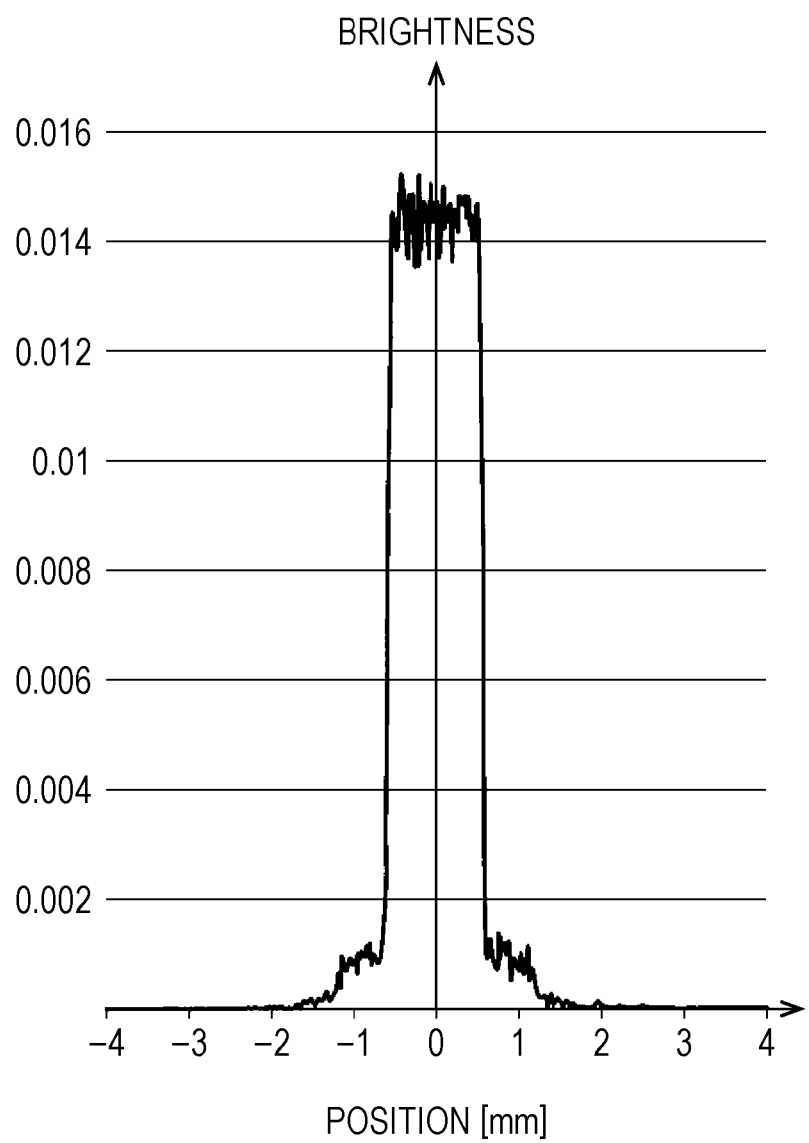

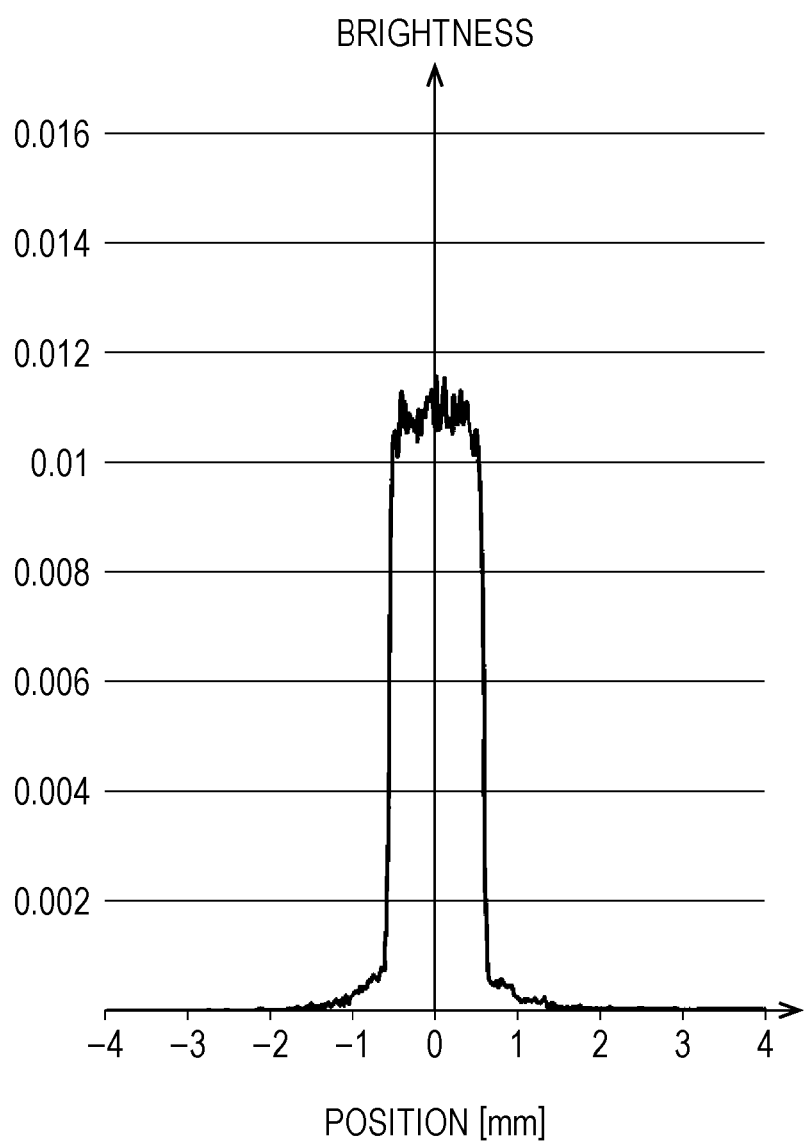

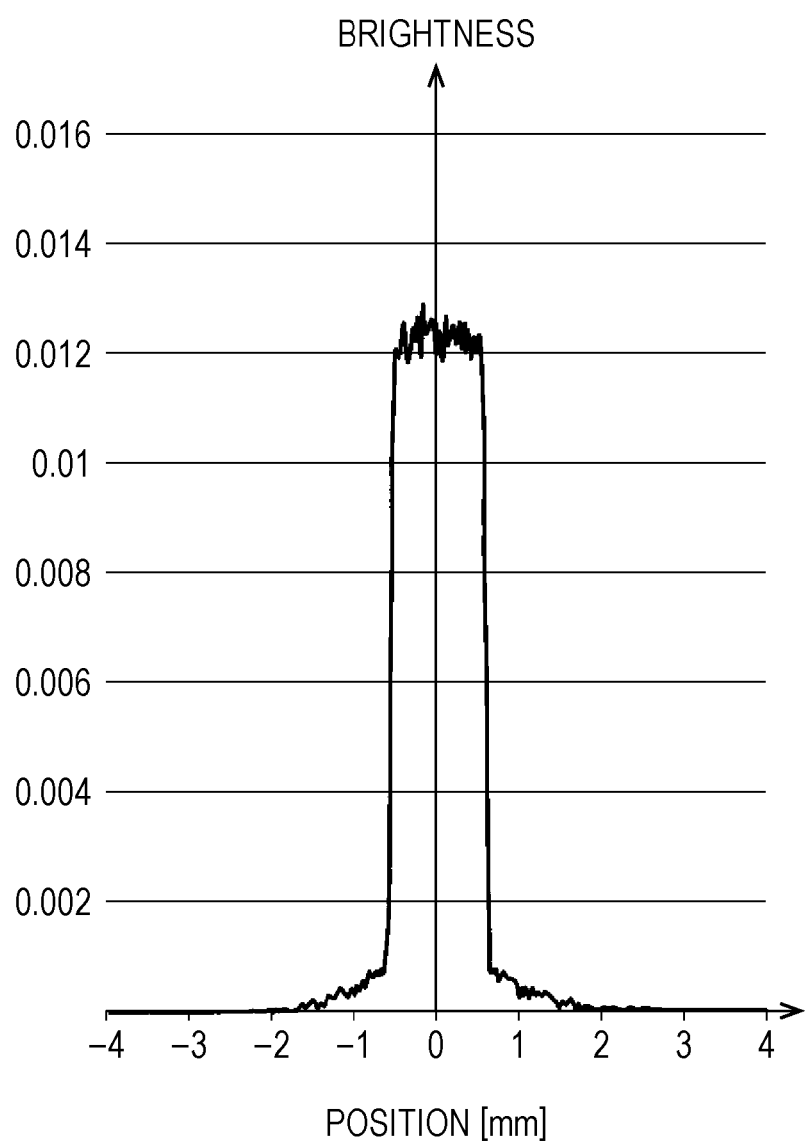

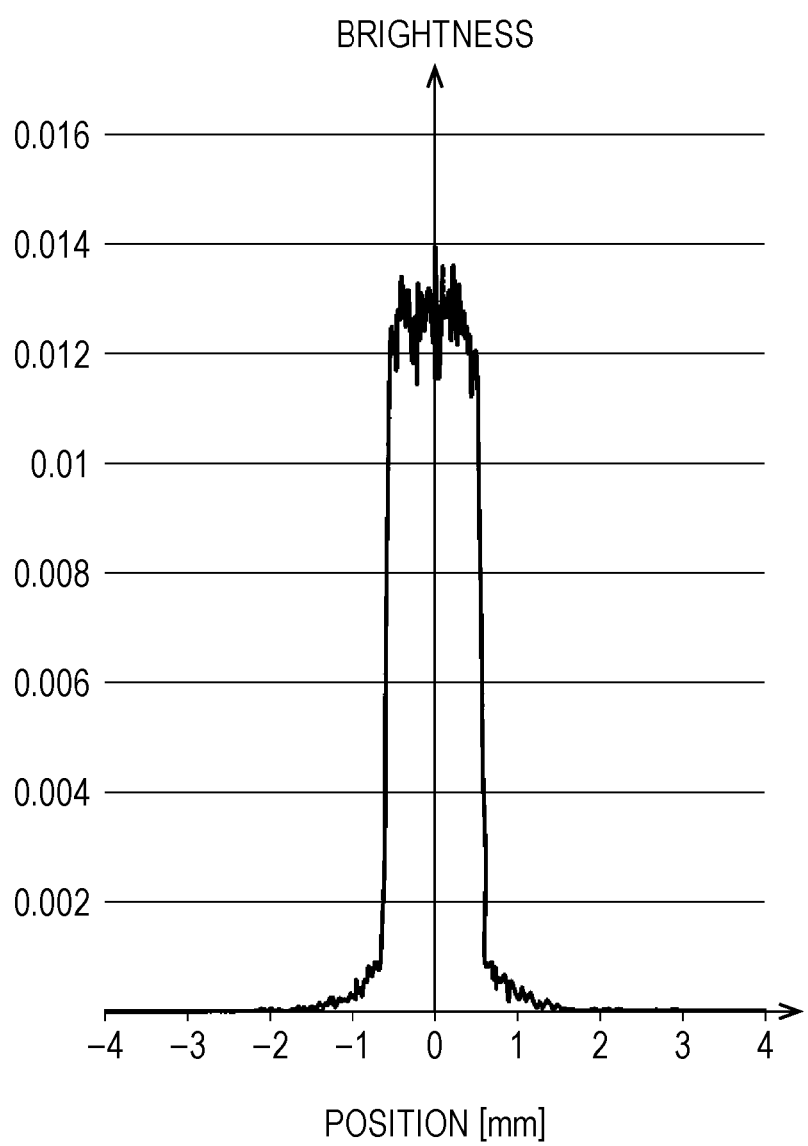

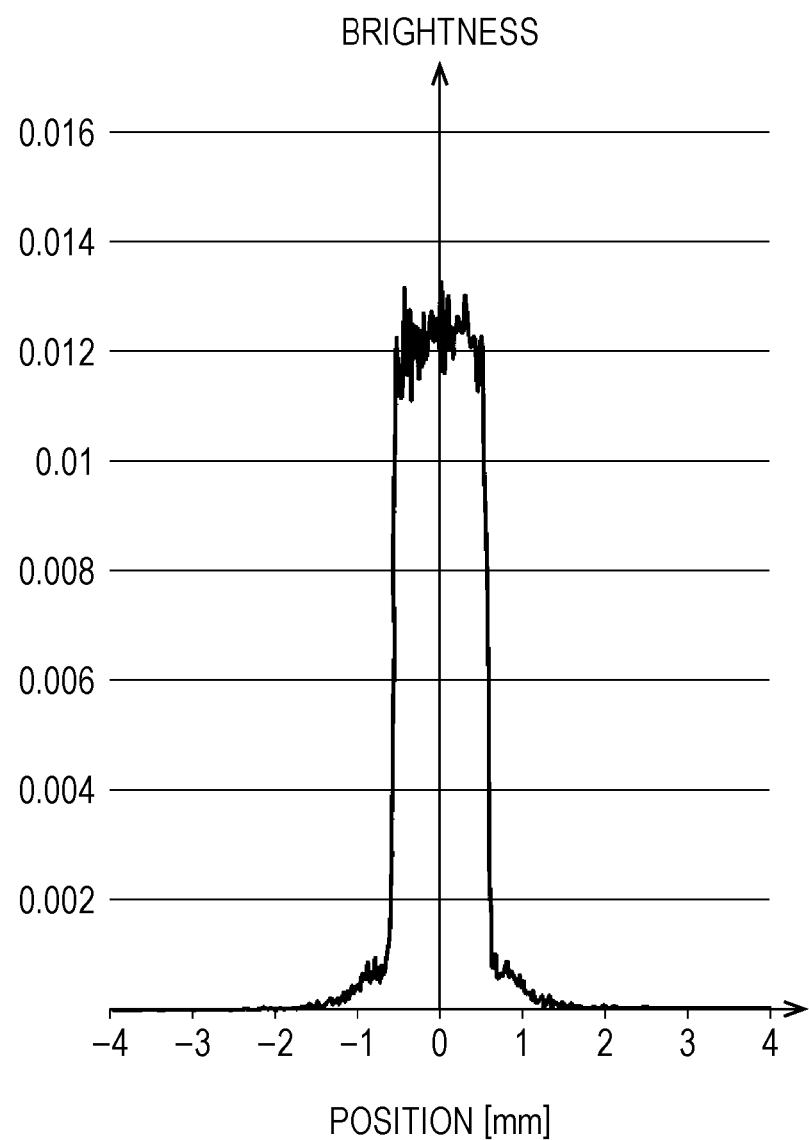

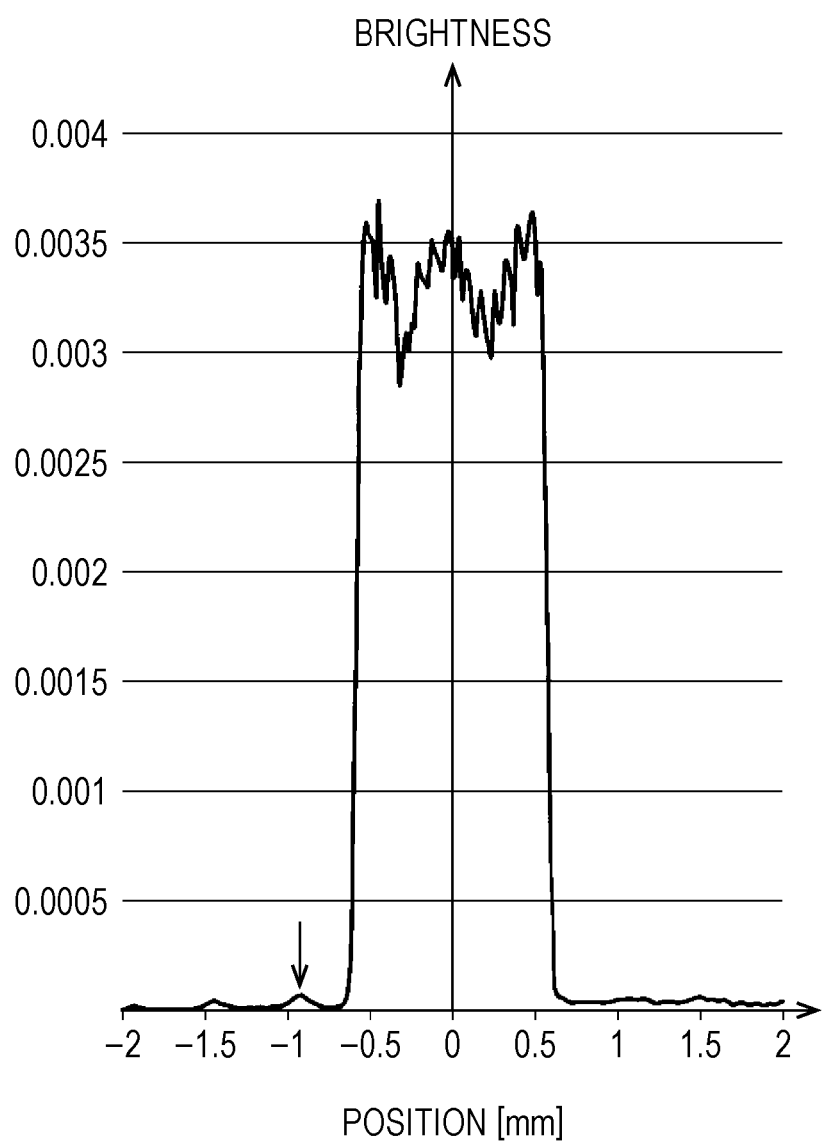

IMAGING OPTICAL ELEMENT

BACKGROUND

1. Technical Field

The present invention relates to an imaging optical element applicable to an image reading apparatus, such as an image scanner.

2. Related Art

In the related art, an image scanner that performs reading of text, images or the like recorded on a reading target is known as an image reading apparatus. Such an image scanner includes an imaging optical element including a lens array in which a plurality of lenses is arranged in a row form, and a light blocking member in which through holes are formed corresponding to the plurality of lenses in order that an optical image of the reading target may be formed by an image sensor including a plurality of imaging element arranged in a row form (for example, JP-A-2000-221442).

In such an imaging optical element, since the light blocking member allows light necessary in image formation to pass through the through holes whereas blocks light that is unnecessary in image formation, the optical image of the reading target is correctly formed in the image sensor.

Incidentally, in such an imaging optical element, light incident on the image sensor without being reflected by the inside surface of the through holes and light incident on the image sensor after being reflected by the inside surface of the through holes are included in the light that passes through the through holes in the light blocking member. The light reflected by the inside surface of the through holes becomes stray light by proceeding in a direction deviating from the optical axis of the lens, and is easily received at a position different from the primary image forming position on the image sensor. In this case, there is a problem if the imaged optical image becomes blurred by such stray light contributing to the image formation of the optical image on the image sensor.

SUMMARY

An advantage of some aspects of the invention is to provide an imaging optical element able to suppress blurring of the imaged optical image by light reflected in the same through holes when passing through the through holes of the light blocking member.

Hereinafter, means of the invention and operation effects thereof will be described.

According to an aspect of the invention, there is provided an imaging optical element including a lens array in which a plurality of lenses are arranged in a row form so that the optical axes are parallel to one another, and an image is formed by forming an incident optical image from one end side in the optical axis direction of the lens array on the other end side. The imaging optical element further includes a light blocking member which is arranged on at least one of one end side and the other end side of the lens array, and in which a plurality of through holes that allow light to pass through is provided in a row form in the same direction as the main scanning direction that is the arrangement direction of the lenses. In the imaging optical element, an inner wall surface of the through hole that intersects the main scanning direction includes a reflection surface that intersects the sub-scanning direction that is orthogonal to the optical axis direction and the main scanning direction, and the reflection surface reflects light incident on the same reflection surface in a direction that intersects the main scanning direction.

In this case, light of the optical image incident from one end side in the optical axis direction is concentrated by the lens array and proceeds to the other end side. Light that deviates from the optical axis out of the optical image incident from one end side in the optical axis direction and that does not enter the through hole is blocked by the light blocking member, and light following the optical axis out of the same optical image proceeds to the other end side by passing through the through hole in the light blocking member.

In the light blocking member, in a case in which light that deviates from the optical axis enters the through hole, such light is reflected by the inner wall surface of the through hole and proceeds to the other end side. In this case, the inner wall surface of the through hole that intersects the arrangement direction (main scanning direction) includes a reflection surface that intersects the sub-scanning direction. Therefore, the light incident on the reflection surface is reflected in a direction that intersects the arrangement direction, and is suppressed from being reflected toward the optical axis. For example, in a case in which light that proceeds in the arrangement direction from the optical axis is incident on the reflection surface of the through hole, such light is reflected in a direction that intersects the arrangement direction.

Accordingly, in a case in which an incident optical image is formed on a line in which the arrangement direction orthogonal to the optical axis is made the longitudinal direction, the light (stray light) reflected in the same through hole when passing through the through hole in the light blocking member is easily incident on a position shifted in the sub-scanning direction from the line. Thus, it is possible to suppress the optical image formed becoming blurry by the light (stray light) reflected in the same through hole when passing through the through hole in the light blocking member not easily contributing to image formation on the line.

In the imaging optical element, it is preferable that the inner wall surface of the through hole that intersects the main scanning direction include a plurality of reflection surfaces.

In this case, it is possible to change the orientation of the reflection surface for each position of the inner wall surface of the through hole. Therefore, it is possible for light (stray light) reflected in the reflection surface of the inner wall surface to easily be incident on a position shifted in the sub-scanning direction from the line, compared to a case in which the inner wall surface of the through hole includes a single reflection surface.

In the imaging optical element, it is preferable that the inner wall surface of the through hole that intersects the main scanning direction include a single reflection surface.

In this case, it is possible to reduce the labor and costs for forming a reflection surface compared to a case of forming a plurality of reflection surfaces in the inner wall surface of the through hole.

In the imaging optical element, it is preferable that the light blocking member be arranged on at least one end side of the lens array.

In this case, light that adversely influences the image formation is suppressed from being incident on the lens array because the majority of the light from the light that deviates from the optical axis from the light that proceeds from one end side of the imaging optical element to the other end side is blocked by the light blocking member arranged on one end side of the lens array. Therefore, it is possible to suppress the formed optical image from becoming blurry, compared to a case in which the light blocking member is not arranged on one side of the lens array, and the light blocking member is arranged only on the other end side of the lens array.

In the imaging optical element, it is preferable that the reflection surface be a smooth surface and a low reflection surface.

In this case, because the light incident on the same reflection surface is reflected (scattered) in various directions in a case in which the reflection surface is a rough surface, there is concern of the light being reflected toward the optical axis. In contrast, in this case, because the reflection surface is made a smooth surface, the light reflected by the same reflection surface is mainly reflected in a direction that intersects the arrangement direction, and it is possible to suppress the light from being reflected toward the optical axis. Through making the reflection surface a low reflection surface, it is possible to reduce the light reflected by the same reflection surface. As one example, the light blocking member may be made light absorbent (for example, black or the like), thus making the reflection surface a low reflection surface.

In the imaging optical element, it is preferable that the area of the cross-section orthogonal to the optical axis direction of the through hole become gradually larger toward the other end side.

In this case, under the assumption that the volumes of the through holes are the same, it is possible for the majority of the light that deviates from the optical axis to be blocked because the area of the cross-section of the through hole of one end side becomes smaller, compared to a case in which the area of the cross-section of the through hole is constant in the optical axis direction. It is possible to make it difficult to reflect the light proceeding through the through hole by the inner wall surface of the same through hole, compared to a case in which the area of the cross-section of the through hole is constant in the optical axis direction. In other words, the light that proceeds along the inner wall surface of the through hole that increases gradually toward the other end side easily proceeds to the other end side by being reflected by the inner wall surface of the same through hole in a case which the volume of the cross-section of the through hole is constant in the optical axis direction. Therefore, in this case, it is possible to make it difficult for the light proceeding from one end side to the other end side to be reflected by the inner wall surface of the through hole by the light blocking member.

In the imaging optical element, it is preferable that the area of the cross-section orthogonal to the optical axis direction in the through hole become gradually smaller toward the other end side.

In this case, the light incident on the inner wall surface of the through hole from the one end side is easily reflected to the same one end side, compared to a case in which the area of the cross-section of the through hole is constant in the optical axis direction. Therefore, it is possible to further suppress the contribution of light reflected by the inner wall surface of the through hole to image formation on the other end side of the lens array.

BRIEF DESCRIPTION OF THE DRAWINGS

The invention will be described with reference to the accompanying drawings, wherein like numbers reference like elements.

FIG. 4A is a cross-sectional view of the CISM orthogonal to the sub-scanning direction for describing the progression state of light in the CISM of the comparative example.

FIG. 4B is a cross-sectional view of the CISM orthogonal to the arrangement direction for describing the progression state of light in the CISM of the comparative example.

FIG. 4C is a plan view of a first light blocking member for describing the progression state of light in the CISM of the comparative example.

FIG. 5A is a cross-sectional view of the CISM orthogonal to the sub-scanning direction for describing the progression state of light in the CISM of the first embodiment.

FIG. 5B is a cross-sectional view of the CISM orthogonal to the arrangement direction for describing the progression state of light in the CISM of the first embodiment.

FIG. 5C is a plan view of a first light blocking member for describing the progression state of light in the CISM of the first embodiment.

FIG. 6 is a graph showing the light receiving state using the CISM of the comparative example.

FIG. 7 is a graph showing the light receiving state using the CISM of the first embodiment.

FIG. 11 is a graph showing the light receiving state using the CISM of the third embodiment.

FIG. 12 is a graph showing the light receiving state using the CISM of a fourth embodiment.

FIG. 13 is a graph showing the light receiving state using the CISM of a fifth embodiment.

FIG. 16 is a graph showing the light receiving state using the CISM of a comparative example with respect to the sixth embodiment.

DESCRIPTION OF EXEMPLARY EMBODIMENTS

First Embodiment

Below, one embodiment in which the imaging optical element is realized by a contact image sensor module (below, also referred to as a "CISM") will be described with reference to the drawings.

Figure 1:
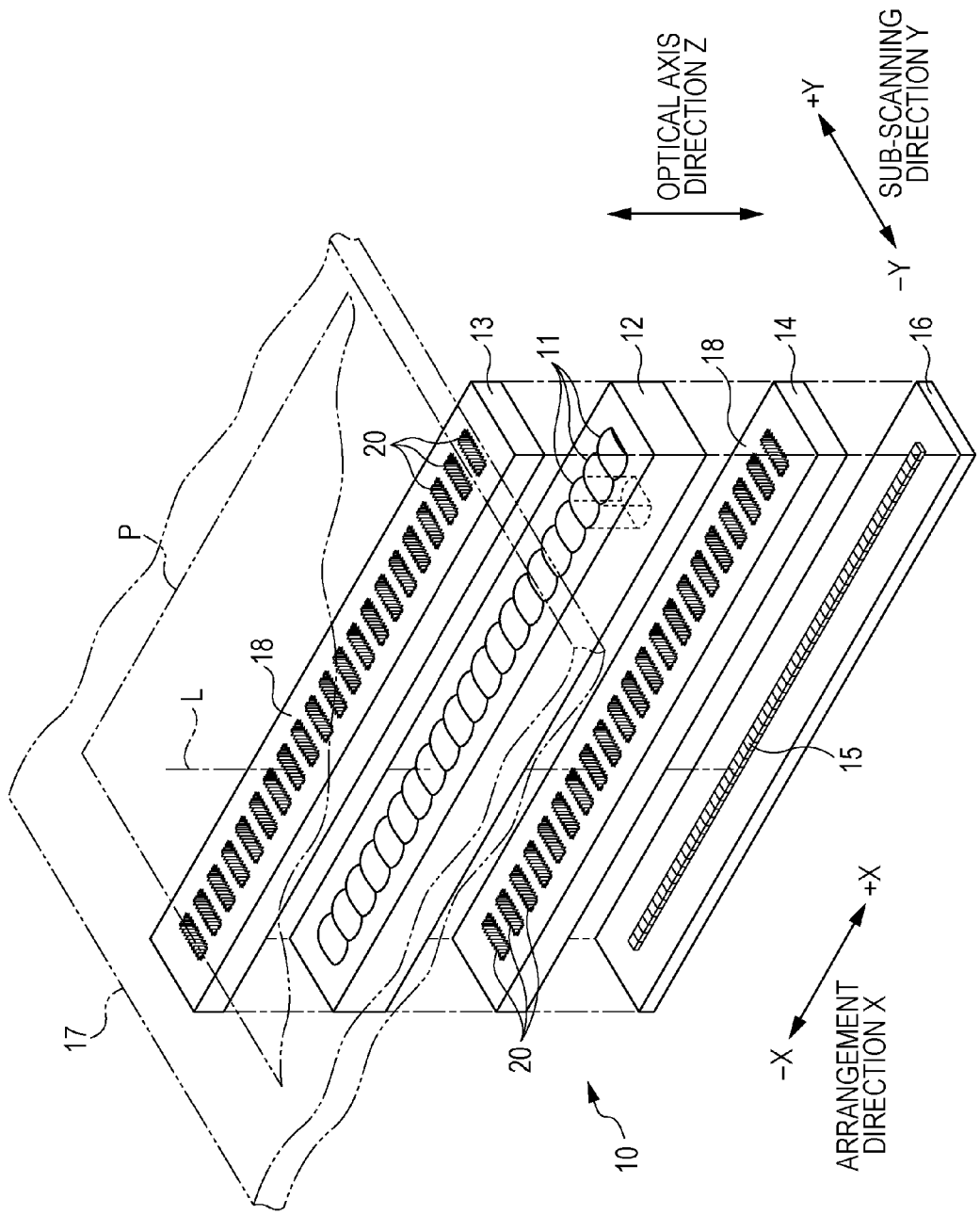
FIG. 1 is a perspective view showing a schematic configuration of a CISM of a first embodiment.

As shown in FIG. 1, a CISM 10 includes a lens array 12 in which a plurality of lenses 11 is arranged in a row form so that the optical axes L become parallel to one another, a first light blocking member 13 and a second light blocking member 14 in which through holes 20 through which light is able to pass are provided, and a light receiving portion 16 including a linear-type image sensor 15. A platen 17 on which a document P is mounted as one example of a reading target is provided on one end side that is the opposite side to the other end side on which the first light blocking member 13 faces the lens array 12.

In the subsequent description, the direction in which the plurality of lenses 11 in the lens array 12 is arranged is referred to as the "arrangement direction X" or the "main scanning direction X", and the direction (vertical direction in FIG. 1) in which the optical axis L of the lens 11 extends is referred to as the "optical axis direction Z". In the optical axis direction Z, the document P side is referred to as "one end side", and the light receiving portion 16 side is referred to as "the other end side". The direction orthogonal to both the arrangement direction X (main scanning direction X) and the optical axis direction Z is referred to as the "sub-scanning direction Y". Incidentally, the sub-scanning direction Y is the direction in which the CISM 10 moves relative to the document P when performing reading of the same document P.

The lens array 12 is provided in order for light incident on the lens 11 to be concentrated on the image sensor 15. A rod lens array in which a plurality of lenses 11 forming a rod shape as in the embodiment is arranged may be used as the lens array 12, or another lens array may be used. The image sensor 15 includes "one unit" of the image element in the sub-scanning direction Y and a plurality of imaging elements (for example, "2048 units") in the arrangement direction X. Therefore, the image sensor 15 is able to image "one line" in the arrangement direction X of an image.

The first light blocking member 13 and the second light blocking member 14 (below, referred to as "light blocking members 13 and 14") are provided at one end side and the other end side of the lens array 12 in the optical axis direction Z. The light blocking members 13 and 14 are formed in a plate shape in which the arrangement direction X is the longitudinal direction and the sub-scanning direction Y is the short direction, and are formed in the same shape in the present embodiment. The surface of the one end side of the light blocking members 13 and 14 in the optical axis direction Z becomes the light blocking surface 18 that blocks light proceeding toward the other end side from the one end side. In the light blocking members 13 and 14, the distance between the centers of adjacent through holes 20 is the same as the distance between the centers of adjacent lenses 11 in the lens array 12. Therefore, the center position of each lens 11 and the center position of each through hole 20 match in plan view in the optical axis direction Z, and each through hole 20 is provided corresponding to each lens 11 in the lens array 12.

Figure 2A:
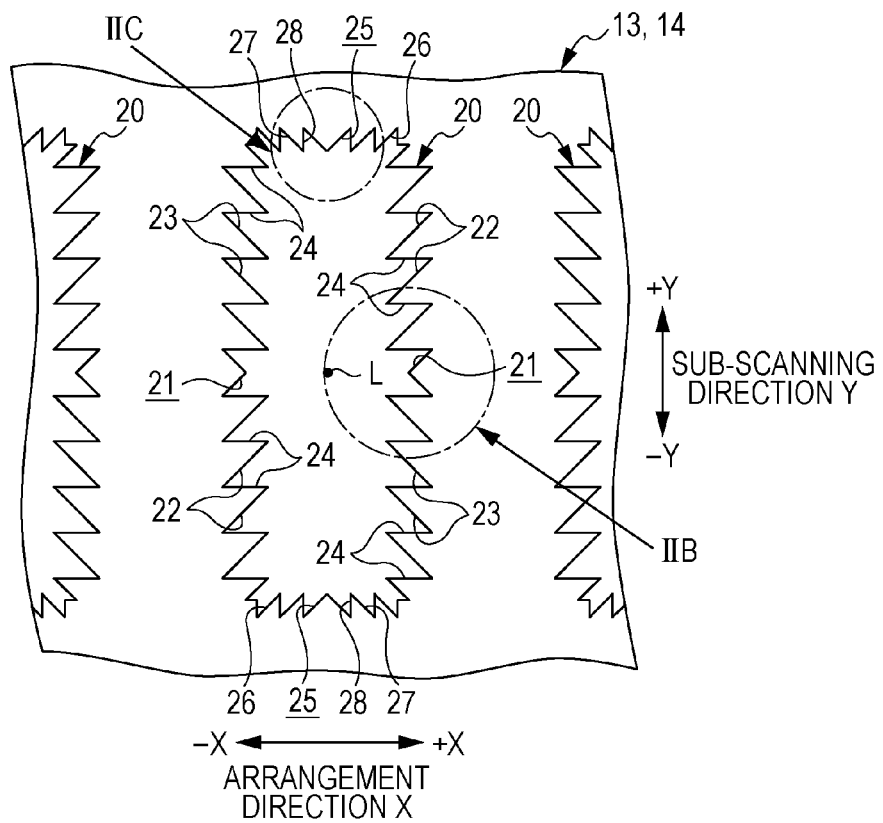
FIGS. 2A to 2C are partial plan views of a light blocking member included in the CISM of the first embodiment.

As shown in FIG. 2A, the through holes 20 of the light blocking members 13 and 14 have a shorter length dimension in the arrangement direction X than the length dimension in the sub-scanning direction Y. In the through holes 20, the inner wall surface 21 that intersects the arrangement direction X is formed in a serrated shape by having a plurality of reflection surfaces 22, 23, and 24, and the inner wall surface 25 that intersects the sub-scanning direction Y is formed in a serrated shape by having a plurality of reflection surfaces 26, 27, and 28.

Figure 2B:
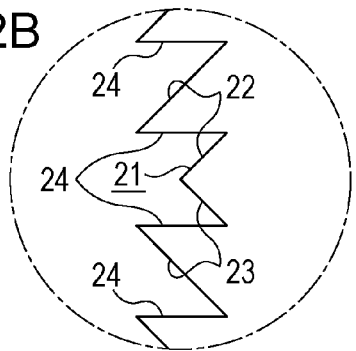

As shown in FIGS. 2A and 2B, the inner wall surface 21 that intersects the arrangement direction X includes the reflection surfaces 22 and 23 that intersect the sub-scanning direction Y at an angle of 45 degrees, and the reflection surfaces 24 that intersect (are orthogonal to) the sub-scanning direction Y at an angle of 90 degrees. The reflection surfaces 22 are made surfaces following the direction formed between the arrangement direction +X and the sub-scanning direction +Y, and the reflection surfaces 23 are made surfaces following the direction formed between the arrangement direction +X and the sub-scanning direction -Y. In the inner wall surface 21, the inner wall surfaces of the arrangement direction +X side and the sub-scanning direction +Y side and the arrangement direction -X side and the sub-scanning direction -Y side are formed in a serrated shape by continuously alternating the reflection surfaces 22 and the reflection surfaces 24. In the inner wall surface 21, the inner wall surfaces of the arrangement direction +X side and the sub-scanning direction -Y side, and the sub-scanning direction +Y side and the arrangement direction -X side are formed in a serrated shape by continuously alternating the reflection surfaces 23 and the reflection surfaces 24. In the inner wall surface 21, the inner wall surface positioned in the arrangement direction +X and the arrangement direction -X from the optical axis L is formed in a convex form toward the optical axis L by the reflection surface 22 and the reflection surface 23.

Figure 2C:
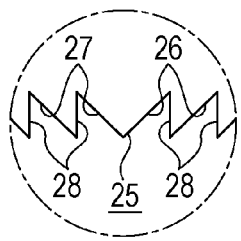

As shown in FIGS. 2A and 2C, the inner wall surface 25 that intersects the sub-scanning direction Y includes the reflection surfaces 26 and 27 that intersect the arrangement direction X at an angle of 45 degrees, and reflection surfaces 28 that intersect (are orthogonal to) the arrangement direction X at an angle of 90 degrees. The reflection surfaces 26 are made surfaces following the direction formed between the arrangement direction +X and the sub-scanning direction +Y, and the reflection surfaces 27 are made surfaces following the direction formed between the arrangement direction +X and the sub-scanning direction -Y. In the inner wall surface 25, the inner wall surfaces of the arrangement direction +X side and the sub-scanning direction +Y side and the arrangement direction -X side and the sub-scanning direction -Y side are formed in a serrated shape by continuously alternating the reflection surfaces 26 and the reflection surfaces 28. In the inner wall surface 25, the inner wall surfaces of the arrangement direction +X side and the sub-scanning direction -Y side and the arrangement direction -X side and the sub-scanning direction +Y side are formed in a serrated shape by continuously alternating the reflection surfaces 27 and the reflection surfaces 28. In the inner wall surface 25, the inner wall surface positioned in the sub-scanning direction +Y and the sub-scanning direction −Y from the optical axis L is formed in a convex form toward the optical axis L by the reflection surface 26 and the reflection surface 27.

Thus, the planar shape of the through hole 20 in the optical axis direction Z is linearly symmetric with a straight line parallel to the arrangement direction X passing through the optical axis L as the axis of symmetry, and linearly symmetric with a straight line parallel to the sub-scanning direction Y passing through the optical axis L as the axis of symmetry, and point symmetric with the optical axis L as the axis of symmetry. The area of the cross-section orthogonal to the optical axis direction Z of the through hole 20 is a constant area in the optical axis direction Z. The inner wall surfaces 21 and 25 (reflection surfaces 22 to 24 and 26 to 28) of the through hole 20 are smooth surfaces and low reflection surfaces. The term "smooth surface" indicates not being a rough surface in which the surface is intentionally roughened. Accordingly, in a case in which a resin is selected as the material for the light blocking members 13 and 14 and the same resin is formed by injection molding, the surface formed by the injection molding is the smooth surface. That is, even without being subjected to a polishing step after injection molding, the injection molded surface is a smooth surface. The term "low reflection surface" indicates that the inner wall surfaces 21 and 25 of the through hole 20 are surfaces from which light is not easily reflected. In the embodiment, the inner wall surfaces 21 and 25 of the through holes 20 easily absorb light by configuring the light blocking members 13 and 14 from a black material having light absorbency.

Although the respective dimensions of the through holes 20 in the light blocking members 13 and 14 are able to be arbitrarily set, the following will be described as an example. The lens pitch that is the distance between the centers of the lenses 11 and 11 in the arrangement direction X is "LP", the width of the through hole 20 in the arrangement direction X is "HW", and the length dimension of the reflection surfaces 22 to 24 in the arrangement direction X is "RL". In this case, the width of the through hole 20 may be set to approximately 0.4·LP, and the length dimension of the reflection surfaces 22 to 24 may be set to approximately 0.2·HW.

As shown in FIG. 1, the platen 17 is formed in a thin plate shape from glass, or the like, through which light passes. A document P is mounted on the platen 17 in a state in which the surface on which text or images are recorded that is a reading target faces the CISM 10 with respect to the platen 17.

The CISM 10 blocks light from the light proceeding toward the CISM 10 from the reading surface of the document P mounted on the platen 17, which is unnecessary to image formation with the light blocking members 13 and 14, and forms an image or the like of the reading surface of the document P on the light receiving portion 16 by concentrating light necessary for image formation with the lens array 12. In practice, the light proceeding toward the CISM 10 from the reading surface of the document P is generally reflection light of light the reading surface of the document P is irradiated with through the platen 17 from the light source, not shown.

Next, the operation of the CISM 10 of the embodiment will be described.

Description is provided of the differences in the progression state of light that is to pass through the through hole for the CISM 10 of the embodiment in which the inner wall surface 21 of the through holes 20 of the light blocking members 13 and 14 has a serrated shape, and the CISM 100 of the comparative example (refer to FIGS. 4A to 4C) in which the inner wall surface of the through holes of the light blocking members have a flat shape. The differences in the light receiving state of the image sensor 15 when reading the document P shown in FIG. 3 in the CISM 10 of the embodiment and the CISM 100 of the comparative example will be described.

Figure 3:
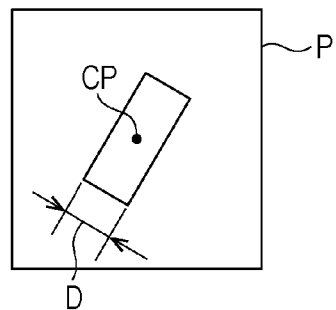
FIG. 3 is a drawing showing a document that is a target for reading by the CISM.

FIG. 3 shows the document P on which white, band-like lines are printed on a black background that is the reading target of the CISM 10 and 100. In a state in which the document P is mounted on the platen 17, the left to right direction (direction in which the dotted and dashed line extends) in FIG. 3 is made the arrangement direction X of the CISM 10 and 100, and the vertical direction (direction orthogonal to the dotted and dashed line) in FIG. 3 is the sub-scanning direction Y of the CISM 10 and 100. The white, band-like lines in the document P are set to a line width D of "1.0 mm" and have a "30 degrees" incline with respect to the sub-scanning direction Y. In FIG. 3, the center position of the white, band-like line is referred to as the reference position CP.

Next, the light L1, L2 and L3 proceeding to the light receiving portion 16 from the reading surface of the document P in the CISM 10 of the embodiment and the CISM 100 of the comparative example will be described with reference to FIGS. 4A to 4C and FIGS. 5A to 5C. The light with the smallest angle with the optical axis L from the light L1 to L3 is the light L1, the light with the largest angle with the optical axis L is the light L3, and the light with an angle with the optical axis L the same as or more than the light L1 and less than the light L3 is the light L2. On this point, in the subsequent description, the light L1 is also referred to as the "light L1 following the optical axis L", the light L2 is also referred to as the "light L2 that deviates from the optical axis L", and the light L3 is also referred to as the "light L3 that greatly deviates from the optical axis L". For the ease of comprehension of the description, the lights L1 to L3 are light that progresses along the arrangement direction X from the reading surface of the document P. The light blocking members 101 and 102 of the CISM 100 shown in FIGS. 4A to 4C have the same shape as the light blocking members 13 and 14 in the CISM 10 of the embodiment, with the exception of the inner wall surface 111 of the through hole 110 being flat. For the ease of comprehension of the description in FIGS. 4A to 4C and FIGS. 5A to 5C, depiction of the partial configuration and the cross-section hatching of the lens 11 and the platen 17 are not provided.

As shown in FIGS. 4A and 4B, the light L1 following the optical axis L from the light emitted to the other end side in the optical axis direction Z from the reading surface of the document P is refracted when incident from the platen 17 through the air, and is incident on the lens 11 by passing through the through hole 110 of the first light blocking member 101. Such light L1 is refracted when incident on the lens 11 and when emitted from the lens 11, passes through the through hole 110 of the second light blocking member 102 and is incident on the image sensor 15 of the light receiving portion 16. The light receiving position of the light L1 on the image sensor 15 is on the extended line of the optical axis L of the lens 11 that the same light L1 passes through. Accordingly, the light L1 following the optical axis L is received by the image sensor 15 of the light receiving portion 16 at the primary imaging position PA without shifting position in the arrangement direction X and the sub-scanning direction Y.

The light L3 that greatly deviates from the optical axis L from the light emitted to the other end side in the optical axis direction Z from the reading surface of the document P is refracted when incident from the platen 17 through the air, and is incident on the light blocking surface 18 of the light blocking member 101. Such light L3 is reflected to the one end side in the optical axis direction Z in the same light blocking surface 18. Thus, the light L3 that greatly deviates from the optical axis L is not received by the image sensor 15 of the light receiving portion 16 by being blocked by the light blocking member 101 (light blocking surface 18).

The light L2 that deviates from the optical axis L from the light emitted to the other end side in the optical axis direction Z from the reading surface of the document P is refracted when incident from the platen 17 through the air, and is incident on the lens 11 after being reflected by the inner wall surface 111 of the through hole 110 of the first light blocking member 101. At this time, in plan view in the optical axis direction Z shown in FIG. 4C, the light L2 proceeding in the arrangement direction +X is reflected in the arrangement direction −X by the inner wall surface 111 of the through hole 110 of the first light blocking member 101. That is, the path along which the light L2 proceeds is the same during incidence on the inner wall surface 111 and during reflection, and the light L2 is reflected toward the optical axis L. The reflected light L2 is refracted when incident on the lens 11 and when emitted from the lens 11, and is incident on the light receiving portion 16 after being further reflected by the through hole 110 of the second light blocking member 102. Even in the through hole 110 of the second light blocking member 102, the light L2 that proceeds, for example, in the arrangement direction +X is reflected in the arrangement direction −X, similarly to the through hole 110 of the first light blocking member 101. The light L2 may be reflected only by the inner wall surface 111 of the through hole 110 of the first light blocking member 101 according to the document position read, or may be reflected by only the inner wall surface 111 of the through hole 110 of the second light blocking member 102. Because this stray light appears following the period of the lens pitch in the arrangement direction X, stripe-shaped ghosting, such as the light being dragged in the sub-scanning direction Y, occurs.

As shown in FIG. 4A, the position on which the light L2 is incident on the light receiving portion 16 in the arrangement direction X becomes the position PB shifted from the extended line of the optical axis L of the lens 11 through which the same light L2 passes. Meanwhile, as shown in FIG. 4B, the position on which the light L2 is incident on the light receiving portion 16 in the sub-scanning direction Y becomes the position PB on the extended line of the optical axis L. That is, the light L2 is incident at a position shifted in the arrangement direction −X and not shifted in the sub-scanning direction Y from the point at which the optical axis L and the image sensor 15 cross, which is the primary imaging position. Therefore, the light L2 is incident on the imaging element that is positioned further in the arrangement direction −X than the imaging element of the image sensor 15 at the primary imaging position. Accordingly, by such light L2 being received by the image sensor 15 at a position different from the primary imaging position, in the CISM 100 of the comparative example, there is blurring of the imaged optical image, and a susceptibility to a lowering of the reading precision of the optical image.

In contrast, as shown in FIGS. 5A and 5B, in the CISM 10 of the embodiment, light emitted from the reading surface of the document P to the other end side in the optical axis direction Z proceeds in the CISM 10 as described next.

First, the light L1 following the optical axis L and the light L3 that greatly deviates from the optical axis L from the light emitted from the reading surface of the document P to the other end side in the optical axis direction Z proceed similarly to the CISM 100 of the comparative example.

The light L2 that deviates from the optical axis L from the light emitted to the other end side in the optical axis direction Z from the reading surface of the document P is refracted when incident from the platen 17 through the air, and is incident on the lens 11 after being reflected by the inner wall surface 21 of the through hole 20 of the first light blocking member 13. At this time, in plan view in the optical axis direction Z shown in FIG. 5C, the light L2 that proceeds in the arrangement direction +X is reflected in the sub-scanning direction +Y and the sub-scanning direction −Y by the inner wall surface 21 (reflection surfaces 22 and 23) of the through hole 20 of the first light blocking member 13. That is, the path through which the light L2 proceeds is different during incidence on the inner wall surface 21 and during reflection, and the light L2 is reflected in a direction that intersects (is orthogonal to) the arrangement direction X. The reflected light L2 is refracted when incident on the lens 11 and when emitted from the lens 11, and is incident on the light receiving portion 16 after being further reflected by the through hole 20 of the second light blocking member 14. Even in the through hole 20 of the second light blocking member 14, in a case of light that proceeds, for example, in the arrangement direction +X from the optical axis L, the same light is reflected in the sub-scanning direction +Y and the sub-scanning direction −Y, similarly to the through hole 20 of the first light blocking member 13. Incidentally, because the reflection surfaces 22 and 23 are made low reflection surfaces, to the extent that the light L2 is reflected by the reflection surfaces 22 and 23, the amount of light thereof becomes smaller.

As shown in FIG. 5A, the position at which the light L2 is incident on the light receiving portion 16 in the arrangement direction X becomes the position PC shifted from the extended line of the optical axis L of the lens 11 through which the same light L2 passes. As shown in FIG. 5B, the position at which the light L2 is incident on the light receiving portion 16 in the sub-scanning direction Y becomes the position PC on the extended line of the optical axis L. That is, the light L2 is incident at a position shifted in the arrangement direction −X and shifted in the sub-scanning directions +Y and −Y from the point at which the optical axis L and the image sensor 15 cross, which is the primary imaging position. Therefore, the light L2 is incident on a position PC shifted further in the arrangement direction −X and sub-scanning directions +Y and −Y than the imaging element of the image sensor 15 at the primary imaging position. Accordingly, because the light L2 reflected by the such through holes 20 of the light blocking members 13 and 14 is incident on the light receiving portion 16 at a position shifted in the arrangement direction −X from the image sensor 15, the same light L2 being received on the image sensor 15 at a position different from the primary imaging position is suppressed. That is, in the light blocking members 13 and 14 of the embodiment, by the light reflected by the through hole 20 of the same light blocking members 13 and 14 being reflected in the sub-scanning directions +Y and −Y with the optical axis L as a reference, the light is easily incident on a position shifted in the sub-scanning directions +Y and −Y from the image sensor 15. Accordingly, by the CISM 10 of the embodiment, blurriness of the imaged optical image is suppressed, and lowering of the reading precision of the optical image is further suppressed.

In the above description, for the ease of comprehension of the description, although the light L1 to L3 are light that proceeds in the arrangement direction X from the reading surface of the document P, the light that proceeds in the other direction (for example, direction formed between the arrangement direction X and the sub-scanning direction Y) is suppressed from being reflected toward the optical axis L by the inner wall surfaces 21 and 25 of the through holes 20.

Next, in the CISM 10 of the embodiment and the CISM 100 of the comparative example, the difference in the light receiving states of the image sensor 15 when reading the document P shown in FIGS. 4A to 4C will be described with reference with FIGS. 6 and 7. FIGS. 6 and 7 show the imaging state on the dotted and dashed line of the document P shown in FIG. 3. That is, in FIGS. 6 and 7, the horizontal axis indicates the position on the dotted and dashed line with the reference position CP of the document P as a reference, and the vertical axis indicates the brightness of the received light image of the document P. That is, a case in which the value on the vertical axis is large and the brightness is high is indicated by the color white, and a case in which the value on the vertical axis is low and the brightness is low is indicated by the color black.

As shown in FIG. 6, according to the imaging state of the CISM 100 of the comparative example, at a position of less than "−1.8 mm" and a position of "1.8 mm" or more with the reference position CP (refer to FIGS. 4A to 4C) as a center, the brightness is "substantially 0 (zero)", and the same position is indicated by the color black. Meanwhile, the brightness is higher than other positions at a position of "−0.6 mm" to "0.6 mm" with the reference position CP as a center, and the same position is indicated by the color white. The brightness becomes "0 (zero)" or more at a position of "−1.8 mm" or more and less than "−0.6 mm" and a position of "0.6 mm" or more and less than "1.8 mm" with the reference position CP as a center, and the same position is indicated by a color lighter than black. Thus, calculating the proportion of the maximum value of the brightness at a position of less than "−0.6 mm" and a position of "0.6 mm" or more with the average value of the brightness at the position from "−0.6 mm" to "0.6 mm" as a reference yields "8.9%". Converting the maximum value (8.9%) of the brightness to 256 gradients corresponds to 22 gradient steps. Therefore, a part that should be a primarily black background is read as a color 22 gradient steps closer to white than to black, and the imaged optical image in the CISM 100 of the comparative example easily becomes blurry.

In contrast, as shown in FIG. 7, according to the imaging state of the CISM 10 of the embodiment, the brightness is "substantially 0 (zero)" at a position of less than "−1.6 mm" and a position of "1.6 mm" or more with the reference position CP as a center, and the same position is indicated by the color black. Meanwhile, the brightness is higher than other positions at a position of "−0.6 mm" to "0.6 mm" with the reference position CP as a center, and the same position is indicated by the color white. The brightness becomes "0 (zero)" or more at a position of "−1.6 mm" or more and less than "−0.6 mm" and a position of "0.6 mm" or more and less than "1.6 mm" with the reference position CP as a center, and the same position is indicated by a color lighter than black. Thus, calculating the proportion of the maximum value of the brightness at a position of less than "−0.6 mm" and a position of "0.6 mm" or more with the average value of the brightness at the position from "−0.6 mm" to "0.6 mm" as a reference yields "5.4%". Converting the maximum value (5.4%) of the brightness to 256 gradients corresponds to 13 gradient steps. Therefore, according to the CISM 10 of the first embodiment, reading a black background part of a document P as a black background is possible, and blurry parts do not easily occur in the imaged optical image.

According to the above-described embodiment, the effects indicated below can be obtained.

(1) The inner wall surface 21 of the through hole 20 that intersects the arrangement direction X is made the reflection surfaces 22 to 24 that intersect the sub-scanning direction Y. Therefore, the light incident on the reflection surfaces 22 to 24 is suppressed from being reflected toward the optical axis L, and is reflected in a direction (for example, the sub-scanning directions +Y and −Y) that intersects the arrangement direction X. Accordingly, in a case of forming the incident optical image on the image sensor 15, the light (stray light) reflected in the same through holes 20 when passing through the through holes 20 of the light blocking members 13 and 14 is easily incident on a position shifted in the sub-scanning directions +Y and −Y from the line of the image sensor 15. Thus, it is possible to suppress the optical image formed from becoming blurry by the light (stray light) reflected in the same through hole 20 when passing through the through holes 20 in the light blocking members 13 and 14 not easily contributing to image formation on the line of the image sensor 15.

(2) By arranging the first light blocking member 13 on the one end side of the lens array 12, the majority of light that deviates from the optical axis L from the light that proceeds from the one end side to the other end side of the CISM 10 is blocked by the first light blocking member 13. Therefore, light exerting an adverse influence on the image formation is suppressed from being incident on the lens array 12. Accordingly, it is possible to suppress the imaged optical image from becoming blurry compared to a case in which the first light blocking member 13 is not arranged on the one end side of the lens array 12.

(3) Because the light incident on such reflection surfaces is reflected (scattered) in various directions in a case in which the reflection surfaces 22 to 24 that the inner wall surface 21 of the through hole 20 has are rough surfaces, there is concern of the light reflecting toward the optical axis L. On this point, in the embodiment, because the reflection surfaces 22 to 24 are smooth surfaces, the light reflected by the same reflection surfaces 22 to 24 is mainly reflected in a direction that intersects the arrangement direction X, and it is possible to suppress the light from being reflected toward the optical axis L. Thus, the light reflected by the inner wall surface 21 (reflection surfaces 22 to 24) is suppressed from being received by the image sensor 15. By making the inner wall surface 21 (reflection surfaces 22 to 24) a low reflection surface, the amount of reflected light in the inner wall surface 21 is reduced, and the light reflected by the inner wall surface (reflection surfaces 22 to 24) is further suppressed from being received by the image sensor 15.

Second Embodiment

Next, a second embodiment of the imaging optical element will be described. In the imaging optical element (CISM) of the second embodiment, the shape of the through hole of the light blocking members is different from the first embodiment. Accordingly, in the following description, the parts different from the first embodiment are mainly described, the same members and configurations as the first embodiment are given the same reference numbers, and overlapping description thereof will not be provided.

Figure 8:
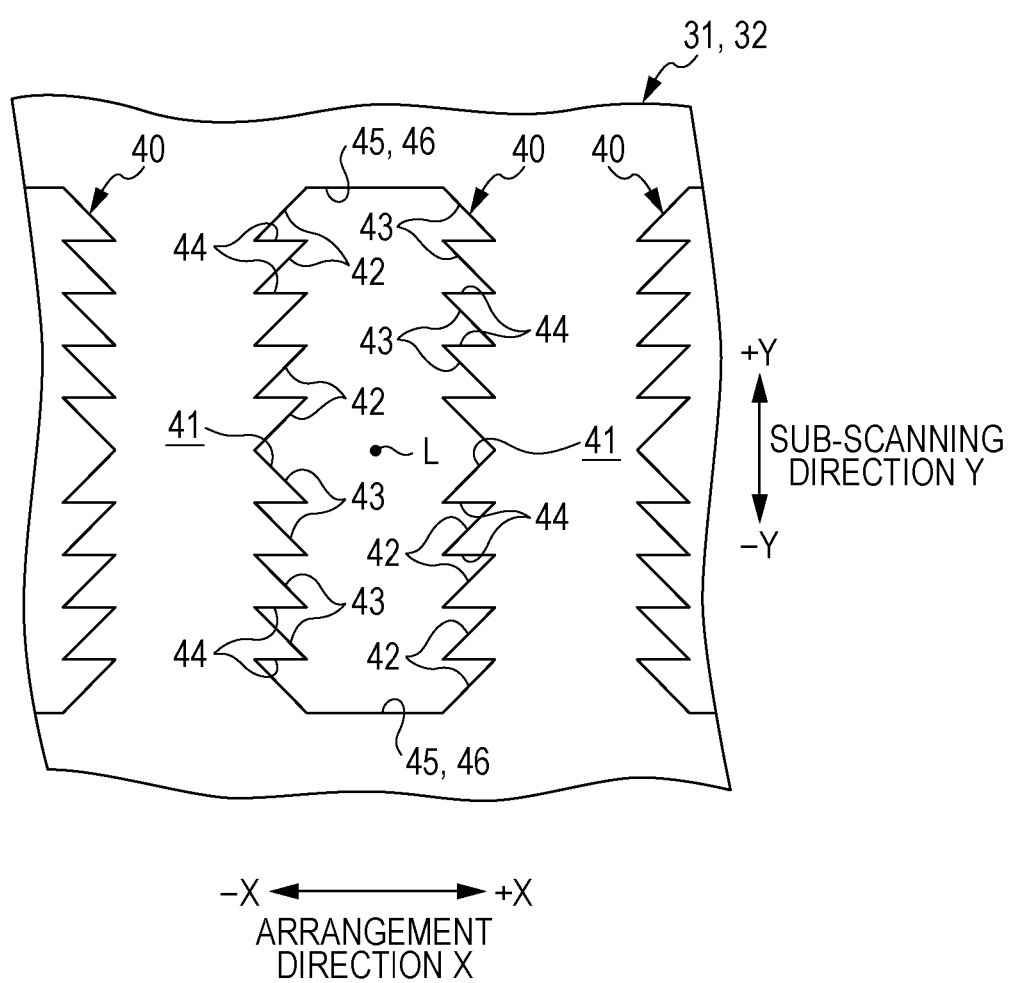
FIG. 8 is a partial plan view of the light blocking member included in the CISM of a second embodiment.

As shown in FIG. 8, through holes 40 are provided in the optical axis direction Z in the first light blocking member 31 and the second light blocking member 32 (below, also referred to as "light blocking members 31 and 32") provided in the CISM of the second embodiment. The through holes 40 of the light blocking members 31 and 32 have a shorter length dimension in the arrangement direction X than the length dimension in the sub-scanning direction Y. In the through hole 40, the inner wall surface 41 that intersects the arrangement direction X is formed in a serrated shape by having a plurality of reflection surfaces 42, 43, and 44, and the inner wall surface 45 that intersects the sub-scanning direction Y has reflection surfaces 46 that intersect (are orthogonal to) the sub-scanning direction Y at an angle of 90 degrees.

The inner wall surface 41 that intersects the arrangement direction X includes the reflection surfaces 42 and 43 that intersect the sub-scanning direction Y at an angle of 45 degrees, and reflection surfaces 44 that intersect (are orthogonal to) the sub-scanning direction Y at an angle of 90 degrees. The reflection surfaces 42 are made surfaces following the direction formed between the arrangement direction +X and the sub-scanning direction +Y, and the reflection surfaces 43 are made surfaces following the direction formed between the arrangement direction +X and the sub-scanning direction −Y. In the inner wall surface 41, the inner wall surfaces of the arrangement direction +X side and the sub-scanning direction +Y side and the arrangement direction −X side and the sub-scanning direction −Y side are formed in a serrated shape by continuously alternating the reflection surfaces 43 and the reflection surfaces 44. In the inner wall surface 41, the inner wall surfaces of the arrangement direction +X side and the sub-scanning direction −Y side and the arrangement direction −X side and the sub-scanning direction +Y side are formed in a serrated shape by continuously alternating the reflection surfaces 42 and the reflection surfaces 44. In the inner wall surface 41, the inner wall surface positioned in the arrangement direction +X and the arrangement direction −X from the optical axis L is formed in a concave form toward the optical axis L by the reflection surface 42 and the reflection surface 43.

Thus, the planar shape of the through hole 40 in the optical axis direction is linearly symmetric with a straight line parallel to the arrangement direction X passing through the optical axis L as the axis of symmetry, and linearly symmetric with a straight line parallel to the sub-scanning direction Y passing through the optical axis L as the axis of symmetry, and point symmetric with the optical axis L as the axis of symmetry. The area of the cross-section orthogonal to the optical axis direction Z of the through hole 40 is a constant area in the optical axis direction Z. The inner wall surface 41 (reflection surfaces 42 to 44) and the inner wall surface 45 (reflection surface 46) of the through holes 40 are smooth surfaces and low reflection surfaces.

Next, the operation of the CISM of the embodiment will be described. In the CISM of the embodiment, the imaging state of the optical image when the document P is read shown in FIG. 3 will be described.

Figure 9:
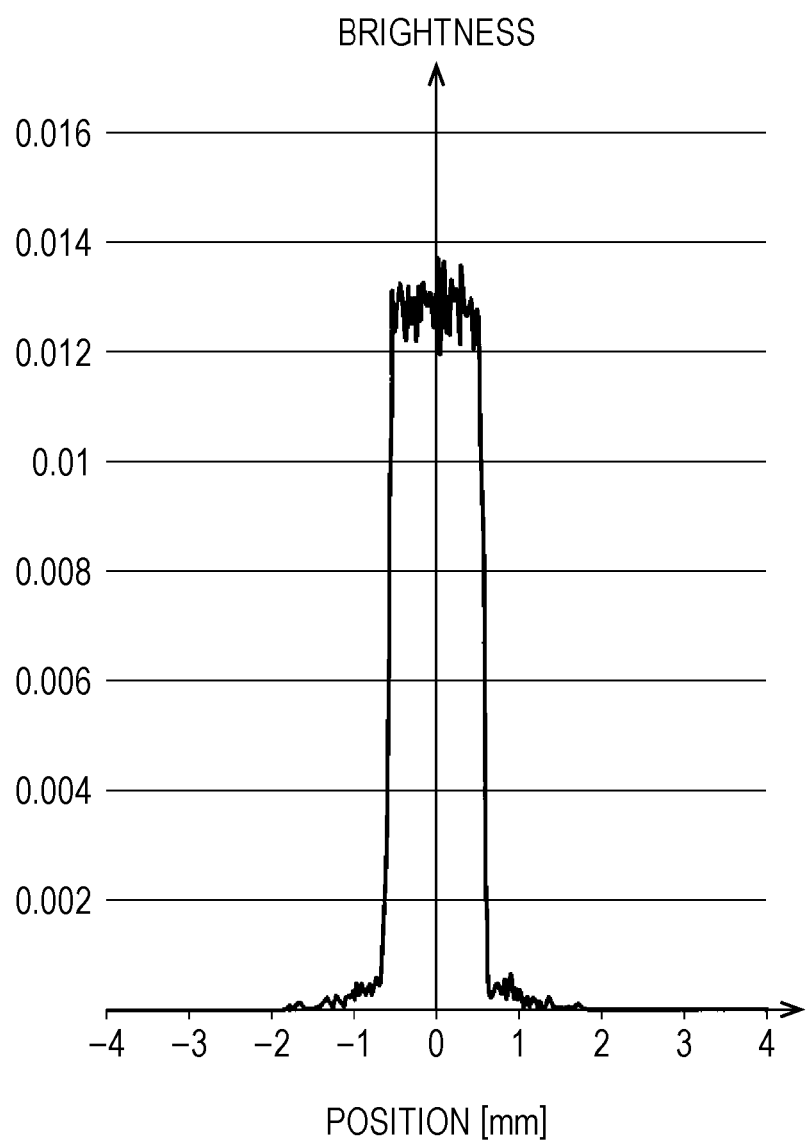
FIG. 9 is a graph showing the light receiving state using the CISM of the second embodiment.

As shown in FIG. 9, according to the imaging state of the CISM of the embodiment, the brightness is "substantially 0 (zero)" at a position of less than "−1.8 mm" and a position of "1.8 mm" or more with the reference position CP as a center, and the same position is indicated by the color black. Meanwhile, the brightness is higher than other positions at a position of "−0.6 mm" to "0.6 mm" with the reference position CP as a center, and the same position is indicated by the color white. The brightness becomes "0 (zero)" or more at a position of "−1.8 mm" or more and less than "−0.6 mm" and a position of "0.6 mm" or more and less than "1.8 mm" with the reference position CP as a center, and the same position is indicated by a color lighter than black. Thus, calculating the proportion of the maximum value of the brightness at a position of less than "−0.6 mm" and a position of "0.6 mm" or more with the average value of the brightness at the position from "−0.6 mm" to "0.6 mm" as a reference yields "4.7%". Because the maximum value (4.7%) of the brightness is less than 12 gradient steps when converted to 256 gradients, according to the second embodiment, reading the black background parts of the document P as a black background is possible, and blurry parts in the imaged optical image do not easily occur compared with the comparative example.

This is because, even in the through holes 40 of the light blocking members 31 and 32 of the second embodiment, light reflected by the inner wall surface 41 of the through holes 40 is incident on a position shifted further in the sub-scanning directions +Y and −Y than the image sensor 15 by the reflection surfaces 42 to 44 that intersect the sub-scanning direction Y. That is, light reflected by the inner wall surface 41 of the through hole 40 of the light blocking members 31 and 32 is suppressed from being incident on the imaging element positioned further in the arrangement direction X than the imaging element of the image sensor 15 at the primary imaging position.

According to the second embodiment, effects equivalent to the effects (1) to (3) of the first embodiment can be obtained.

Third Embodiment

Next, a third embodiment of the imaging optical element will be described. In the imaging optical element (CISM) of the third embodiment, the shape of the through holes of the light blocking members is different from the first embodiment. Accordingly, in the following description, the parts different from the first embodiment are mainly described, the same members and configurations as the first embodiment are given the same reference numbers, and overlapping description thereof will not be provided.

Figure 10:
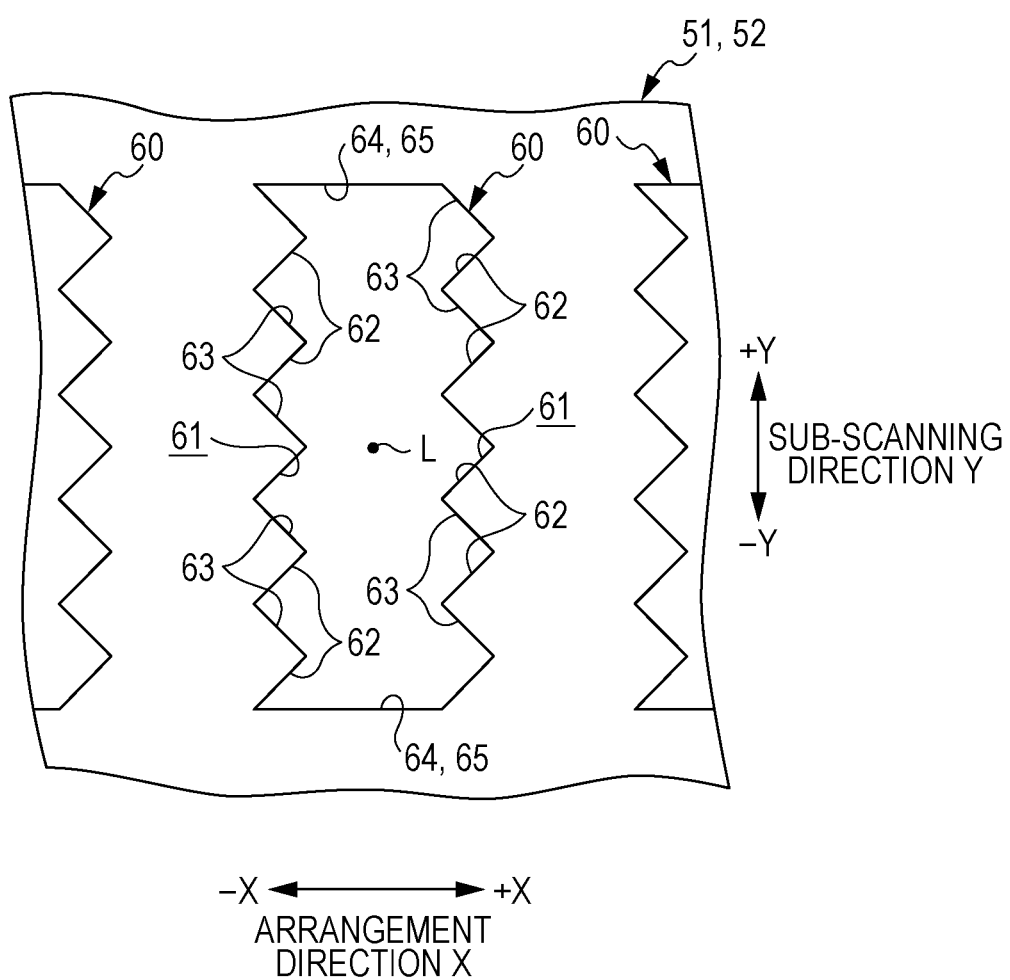
FIG. 10 is a partial plan view of the light blocking member included in the CISM of a third embodiment.

As shown in FIG. 10, through holes 60 are provided in the optical axis direction Z in the first light blocking member 51 and the second light blocking member 52 (below, also referred to as "light blocking members 51 and 52") provided in the CISM of the third embodiment. The through holes 60 of the light blocking members 51 and 52 have a shorter length dimension in the arrangement direction X than the length dimension in the sub-scanning direction Y. In the through holes 60, the inner wall surface 61 that intersects the arrangement direction X is formed in a serrated shape by having a plurality of reflection surfaces 62 and 63 that intersect the sub-scanning direction at an angle of 45 degrees, and the inner wall surface 64 that intersects the sub-scanning direction Y has reflection surfaces 65 that intersect (are orthogonal to) the sub-scanning direction Y at an angle of 90 degrees.

In the inner wall surface 61 that intersects the arrangement direction, the reflection surfaces 62 are made surfaces following the direction formed between the arrangement direction +X and the sub-scanning direction +Y, and the reflection surfaces 63 are made surfaces following the direction formed between the arrangement direction +X and the sub-scanning direction −Y. Thus, the inner wall surface 61 is formed in a serrated shape by continuously alternating the reflection surface 62 and the reflection surface 63. The reflection surfaces 62 on the inner wall surface 61 on the arrangement direction +X side face in the arrangement direction X the reflection surfaces 62 on the inner wall surface 61 on the arrangement direction −X side, and the reflection surfaces 63 on the inner wall surface 61 on the first arrangement direction +X side face in the arrangement direction X the reflection surfaces 63 on the inner wall surface 61 on the arrangement direction −X side. Therefore, as shown in FIG. 10, in plan view in the optical axis direction Z of the through hole 60, the distance between both inner wall surfaces 61 on the arrangement direction +X side and the arrangement direction −X side is constant in the sub-scanning direction Y.

Thus, the shape in plan view in the optical axis direction Z of the through hole 60 is formed in a linearly symmetric shape with a straight line parallel to the arrangement direction X passing through the optical axis L as the axis of symmetry. The area of the cross-section orthogonal to the optical axis direction Z of the through hole 60 is a constant area in the optical axis direction Z. The inner wall surface 61 (reflection surfaces 62 and 63) and the inner wall surface 64 (reflection surface 65) of the through holes 60 are smooth surfaces and low reflection surfaces.

Next, the operation of the CISM 10 of the embodiment will be described. In the CISM 10 of the embodiment, the imaging state of the optical image when the document P is read shown in FIG. 3 will be described.

As shown in FIG. 11, according to the imaging state of the CISM of the embodiment, the brightness is "substantially 0 (zero)" at a position of less than "−1.8 mm" and a position of "1.8 mm" or more with the reference position CP as a center, and the same position is indicated by the color black. Meanwhile, the brightness is higher than other positions at a position of "−0.6 mm" to "0.6 mm" with the reference position CP as a center, and the same position is indicated by the color white. The brightness becomes "0 (zero)" or more at a position of "−1.8 mm" or more and less than "−0.6 mm" and a position of "0.6 mm" or more and less than "1.8 mm" with the reference position CP as a center, and the same position is indicated by a color lighter than black. Thus, calculating the proportion of the maximum value of the brightness at a position of less than "−0.6 mm" and a position of "0.6 mm" or more with the average value of the brightness at the position from "−0.6 mm" to "0.6 mm" as a reference yields "5.3%". Because the maximum value (5.3%) of the brightness is less than 13 gradient steps when converted to 256 gradients, according to the third embodiment, reading the black background parts of the document P as a black background is possible, and blurry parts in the imaged optical image do not easily occur compared with the comparative example.

This is because, even in the through holes 60 of the light blocking members 51 and 52 of the third embodiment, light reflected by the inner wall surface 61 of the through holes 60 is incident on a position shifted further in the sub-scanning directions +Y and −Y than the image sensor 15 by the reflection surfaces 62 and 63 that intersect the sub-scanning direction Y. That is, light reflected by the inner wall surface 61 of the through holes 60 of the light blocking members 51 and 52 is suppressed from being incident on the imaging element positioned further in the arrangement direction X than the imaging element of the image sensor 15 at the primary imaging position.

According to the third embodiment, effects equivalent to the effects (1) to (3) of the first embodiment can be obtained.

Fourth Embodiment

Next, a fourth embodiment of the imaging optical element will be described. In the imaging optical element (CISM) of the fourth embodiment, a difference with the first embodiment is making the first light blocking member a light blocking member of the related art (first light blocking member 101 of the comparative example). Accordingly, in the following description, the parts different from the first embodiment are mainly described, the same members and configurations as the first embodiment are given the same reference numbers, and overlapping description thereof will not be provided.

As described above, the CISM of the fourth embodiment includes the first light blocking member 101 of the comparative example as the first light blocking member and the second light blocking member 14 of the first embodiment as the second light blocking member. That is, the first light blocking member 101 is provided on the one end side of the lens array 12, and the second light blocking member 14 is provided on the other end side of the same lens array 12.

Next, the operation of the CISM of the embodiment will be described. In the CISM of the embodiment, the imaging state of the optical image when the document P is read shown in FIG. 3 will be described.

As shown in FIG. 12, according to the imaging state of the CISM of the embodiment, the brightness is "substantially 0 (zero)" at a position of less than "−1.7 mm" and a position of "1.7 mm" or more with the reference position CP as a center, and the same position is indicated by the color black. Meanwhile, the brightness is higher than other positions at a position of "−0.6 mm" to "0.6 mm" with the reference position CP as a center, and the same position is indicated by the color white. The brightness becomes "0 (zero)" or more at a position of "−1.7 mm" or more and less than "−0.6 mm" and a position of "0.6 mm" or more and less than "1.7 mm" with the reference position CP as a center, and the same position is indicated by a color lighter than black. Thus, calculating the proportion of the maximum value of the brightness at a position of less than "−0.6 mm" and a position of "0.6 mm" or more with the average value of the brightness at the position from "−0.6 mm" to "0.6 mm" as a reference yields "6.3%". Because the maximum value (6.3%) of the brightness is less than 16 gradient steps when converted to 256 gradients, according to the fourth embodiment, reading the black background parts of the document P as a black background is possible, and blurry parts in the imaged optical image do not easily occur compared with the comparative example.

This is because, even in the through hole 20 of the second light blocking member 14 of the fourth embodiment, light reflected by the inner wall surface 21 of the through hole 20 is incident on a position shifted further in the sub-scanning directions +Y and −Y than the image sensor 15 by the reflection surfaces 22 to 24 that intersect the sub-scanning direction Y. That is, light reflected by the inner wall surface 21 of the through hole 20 of the second light blocking member 14 is suppressed from being incident on the imaging element positioned further in the arrangement direction X than the image element of the image sensor 15 at the primary imaging position.

According to the fourth embodiment, effects equivalent to the effects (1) to (3) of the first embodiment can be obtained.

Fifth Embodiment

Next, a fifth embodiment of the imaging optical element will be described. In the imaging optical element (CISM) of the fifth embodiment, a difference with the first embodiment is making the second light blocking member 14 a light blocking member of the related art (second light blocking member 102 of the comparative example). Accordingly, in the following description, the parts different from the first embodiment are mainly described, the same members and configurations as the first embodiment are given the same reference numbers, and overlapping description thereof will not be provided.

As described above, the CISM of the fifth embodiment includes the first light blocking member 13 of the first embodiment as the first light blocking member and the second light blocking member 102 of the comparative example as the second light blocking member. That is, the first light blocking member 13 is provided on one end side of the lens array 12, and the second light blocking member 102 is provided on the other end side of the same lens array 12.

Next, the operation of the CISM 10 of the embodiment will be described. In the CISM 10 of the embodiment, the imaging state of the optical image when the document P is read shown in FIG. 3 will be described.

As shown in FIG. 13, according to the imaging state of the CISM of the embodiment, the brightness is "substantially 0 (zero)" at a position of less than "−1.7 mm" and a position of "1.7 mm" or more with the reference position CP as a center, and the same position is indicated by the color black. Meanwhile, the brightness is higher than other positions at a position of "−0.6 mm" to "0.6 mm" with the reference position CP as a center, and the same position is indicated by the color white. The brightness becomes "0 (zero)" or more at a position of "−1.7 mm" or more and less than "−0.6 mm" and a position of "0.6 mm" or more and less than "1.7 mm" with the reference position CP as a center, and the same position is indicated by a color lighter than black. Thus, calculating the proportion of the maximum value of the brightness at a position of less than "−0.6 mm" and a position of "0.6 mm" or more with the average value of the brightness at the position from "−0.6 mm" to "0.6 mm" as a reference yields "7.3%". Because the maximum value (7.3%) of the brightness is less than 18 gradient steps when converted to 256 gradients, according to the fifth embodiment, reading the black background parts of the document P as a black background is possible, and blurry parts in the imaged optical image do not easily occur compared with the comparative example.

This is because, even in the through hole 20 of the first light blocking member 13 of the fifth embodiment, light reflected by the inner wall surface 21 of the through hole 20 is incident on a position shifted further in the sub-scanning directions +Y and −Y than the image sensor 15 by the reflection surfaces 22 to 24 that intersect the sub-scanning direction Y. That is, light reflected by the inner wall surface 21 of the through hole 20 of the first light blocking member 13 is suppressed from being incident on the imaging element positioned further in the arrangement direction X than the image element of the image sensor 15 at the primary imaging position.

According to the fifth embodiment, effects equivalent to the effects (1) to (3) of the first embodiment can be obtained.

Sixth Embodiment

Next, a sixth embodiment of the imaging optical element will be described. In the imaging optical element (CISM) of the sixth embodiment, the shape of the through holes of the first light blocking member and the second light blocking member is different from the first embodiment. Accordingly, in the following description, the parts different from the first embodiment are mainly described, the same members and configurations as the first embodiment are given the same reference numbers, and overlapping description thereof will not be provided.

Figure 14A:
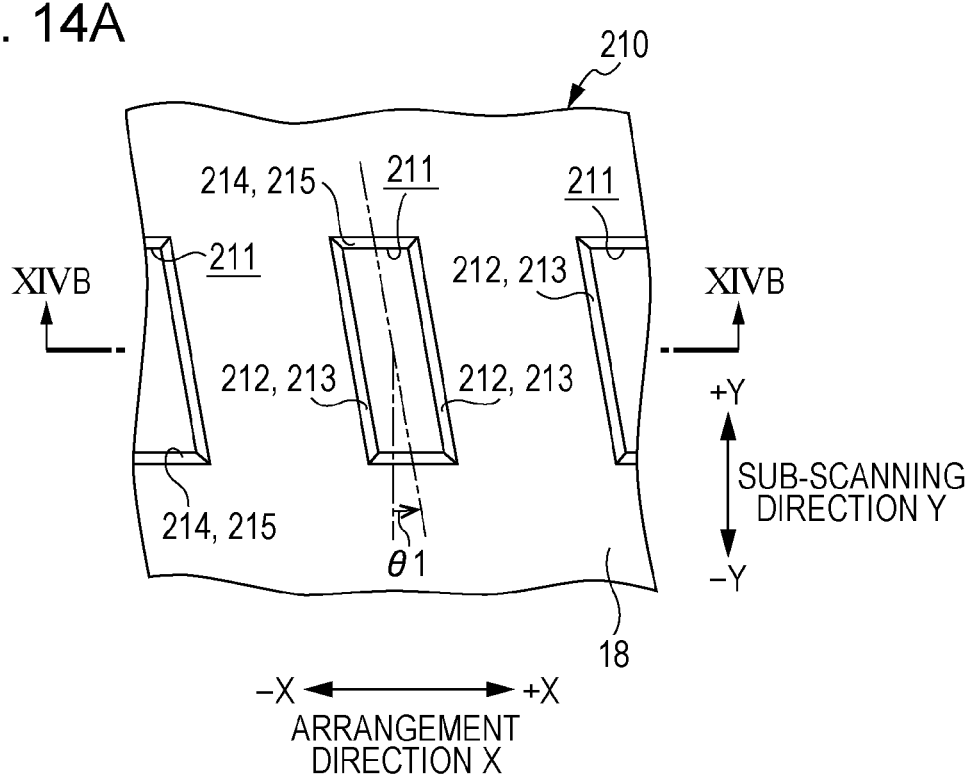
FIG. 14A is a partial plan view of showing the first light blocking member provided in the CISM of a sixth embodiment.
Figure 14B:
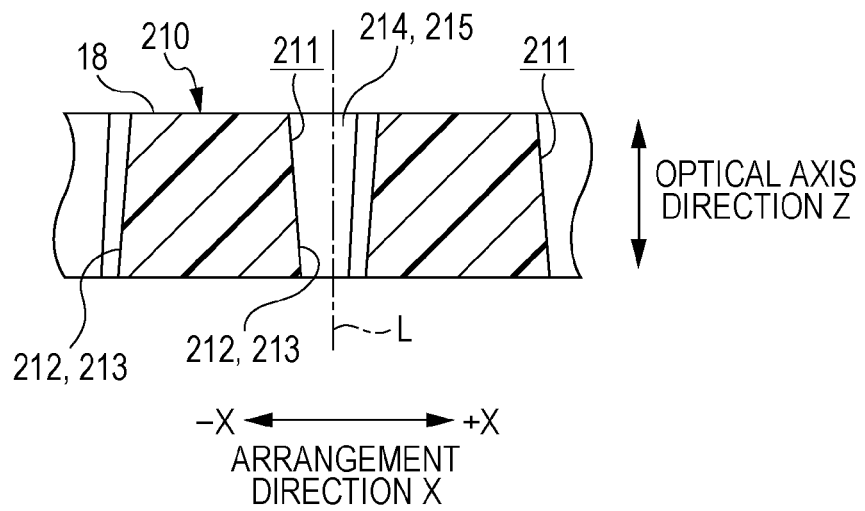
FIG. 14B is a cross-sectional view of the first light blocking member provided in the CISM of the sixth embodiment taken along the line XIVB-XIVB in FIG. 14A.
Figure 15A:
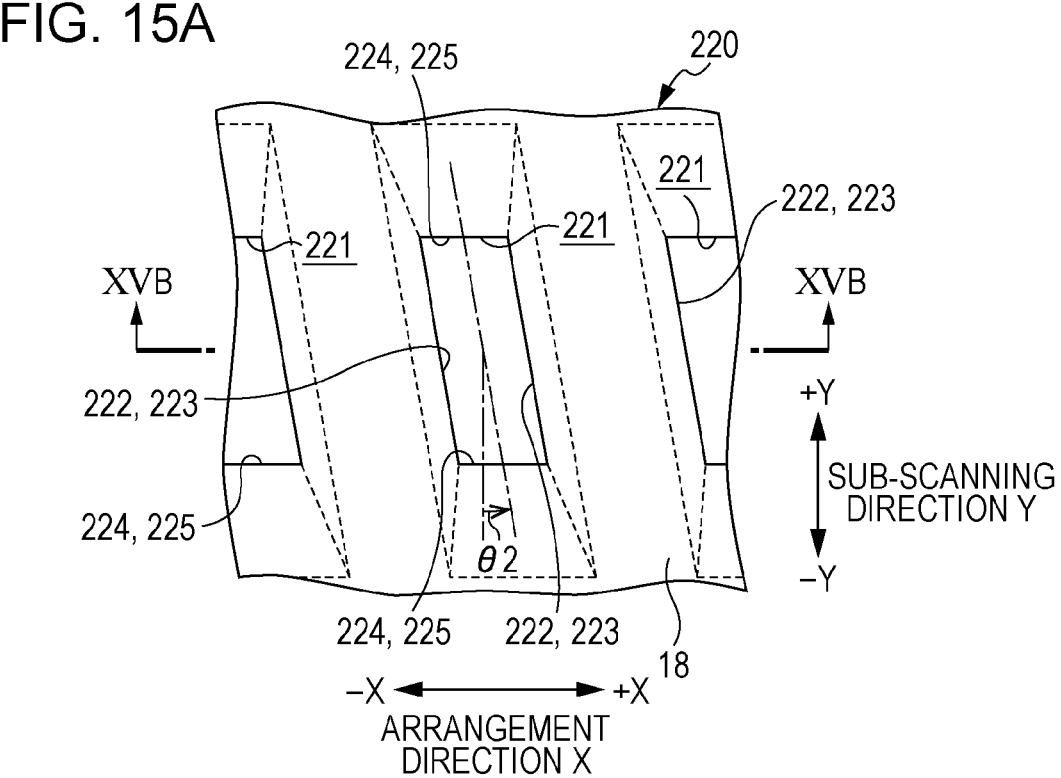
FIG. 15A is a partial plan view of showing the second light blocking member provided in the CISM of the sixth embodiment.

As shown in FIGS. 14A and 14B and FIGS. 15A and 15B, the CISM of the sixth embodiment includes a first light blocking member 210 in which first through holes 211 through which light proceeding in the optical axis direction Z is able to pass are formed, and a second light blocking member 220 in which second through holes 221 through which light proceeding in the optical axis direction Z is able to pass are formed. FIGS. 14A and 15A are seen from the one end side in the optical axis direction Z, that is, illustrate the first light blocking member 210 and the second light blocking member 220 seen from the platen 17 side.

The first light blocking member 210 is provided on one end side of the lens array 12 in the optical axis direction Z, and the second light blocking member 220 is provided on the other end side of the lens array 12 in the optical axis direction Z. The first light blocking member 210 and the second light blocking member 220 (below, also referred to as "light blocking members 210 and 220") are formed in a plate shape in which the arrangement direction X is the longitudinal direction, and the sub-scanning direction Y is the short direction. The surface of the one end side of the light blocking members 210 and 220 in the optical axis direction Z becomes the light blocking surface 18 that blocks light proceeding toward the other end side from the one end side. In the light blocking members 210 and 220, the distance between the centers of adjacent through holes 211 and 221 is the same as the distance between the centers (lens pitch) of adjacent lenses 11 in the lens array 12. That is, the first through holes 211 and the second through holes 221 are provided corresponding to the lenses 11 of the lens array 12, and it is preferable that the center positions of each through hole 211 and 221 match the center positions of each lens 11 in the optical axis direction Z.

As shown in FIGS. 14A and 14B, the first through holes 211 of the first light blocking member 210 are formed in a shape of a substantial parallelogram in plan view thereof. Whereas the short direction of the first through holes 211 in plan view thereof is made a direction that follows the arrangement direction X, the longitudinal direction in the same plan view intersects the sub-scanning direction Y. When the orientation of the longitudinal direction with respect to the sub-scanning direction Y is made the angle of rotation $\theta1$ of the first through holes 211, the same angle of rotation $\theta1$ becomes "10 degrees".

The inner wall surface 212 that intersects the arrangement direction X in the first through holes 211 includes a single reflection surface 213 that intersects the sub-scanning direction Y, and the inner wall surface 214 that intersects the direction formed by the orientation of the angle of rotation $\theta1$ with respect to the sub-scanning direction Y includes a single reflection surface 215 following the arrangement direction X. The inner wall surfaces 212 and 214 (reflection surfaces 213 and 215) of the through holes 211 are preferably smooth surfaces and low reflection surfaces.

As shown in FIG. 14B, the cross-sectional area orthogonal to the optical axis direction Z of the first through holes 211 becomes gradually smaller toward the other end side, and the reflection surfaces 213 and 215 intersect the optical axis direction Z. It is preferable that the reflection surfaces 213 and 215 of the first through holes 211 have, for example, an orientation of "4 degrees" with respect to the optical axis direction Z such that the facing reflection surfaces 213 and 215 gradually approach each other toward the other end side following the optical axis direction Z. This takes the release characteristics in a case of injection molding the first light blocking member 210 in a die with a resin material into consideration.

Figure 15B:
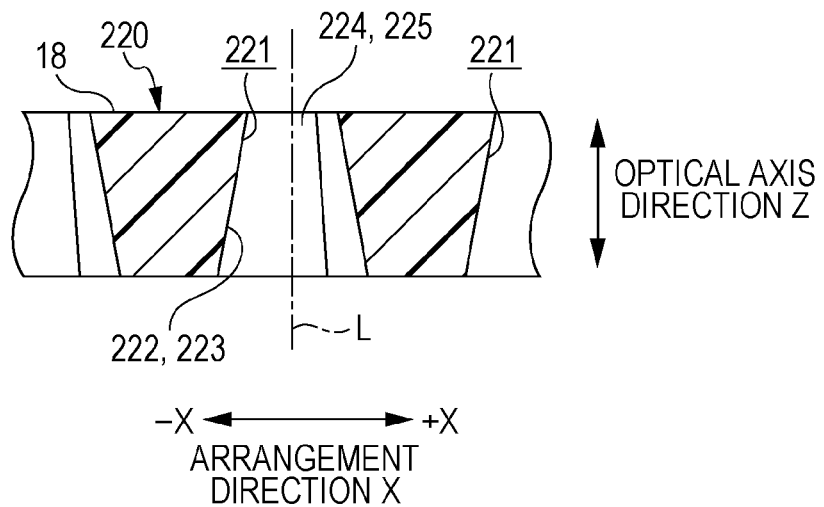
FIG. 15B is a cross-sectional view of the second light blocking member provided in the CISM of the sixth embodiment taken along the line XVB-XVB in FIG. 15A.

As shown in FIGS. 15A and 15B, the second through holes 221 of the second light blocking member 220 are formed in a shape of a substantial parallelogram in plan view thereof. Whereas the short direction of the second through holes 221 in plan view thereof is made a direction that follows the arrangement direction X, the longitudinal direction in the same plan view intersects the sub-scanning direction Y. When the orientation of the longitudinal direction with respect to the sub-scanning direction Y is made the angle of rotation θ2 of the second through holes 221, the same angle of rotation θ2 becomes "10 degrees". That is, in the embodiment, the angle of rotation θ1 of the first through holes 211 is the same as the angle of rotation θ2 of the second through holes 221.

The inner wall surface 222 that intersects the arrangement direction X in the second through holes 221 includes a single reflection surface 223 that intersects the sub-scanning direction Y, and the inner wall surface 224 that intersects the direction formed by the orientation of the angle of rotation θ2 with respect to the sub-scanning direction Y includes a single reflection surface 225 following the arrangement direction X. The inner wall surfaces 222 and 224 (reflection surfaces 223 and 225) of the through hole 221 are preferably smooth surfaces and low reflection surfaces.

As shown in FIG. 15B, the cross-sectional area orthogonal to the optical axis direction Z of the second through holes 221 becomes gradually larger toward the other end side, and the reflection surfaces 223 and 225 intersect the optical axis direction Z. It is preferable that the reflection surfaces 223 in the second through hole 221 have, for example, an orientation of "10 degrees" with respect to the optical axis direction Z such that the facing reflection surfaces 223 gradually separate from each other toward the other end side following the optical axis direction Z. It is preferable that the reflection surfaces 225 of the second through holes 221 have, for example, an orientation of "35 degrees" with respect to the optical axis direction Z such that the facing reflection surfaces 225 gradually separate from each other toward the other end side following the optical axis direction Z. Similarly to the first light blocking member 210, this takes the release characteristics in a case of injection molding the second light blocking member 220 in a die with a resin material into consideration.

Incidentally, in a general CISM, in order for the image with a high number of pixels to be readable, it is necessary that the imaging elements of the image sensor 15 provided so as to be lined up in the arrangement direction X be reduced in size and that the number of imaging elements arranged for each unit length in the arrangement direction X be increased. In accompaniment thereto, it is necessary that the size of the lenses 11 and the size of the through holes 211 and 221 be reduced, and that the number of lenses 11 and the number of through holes 211 and 221 arranged for each unit length in the arrangement direction X be increased.

In such a case, there are cases in which the centers of the through holes 211 and 221, the centers of the lenses 11, and the centers of the imaging elements which have a correspondence relationship in the CISM do not necessarily all match in the optical axis direction Z, in light of problems with the work precision and assembly precision in the light blocking members, lens array 12 and the image sensor 15. In this case, light reflected by the inner wall surface (reflection surface) of the through hole of the light blocking member is easily incident on the imaging element positioned further in the arrangement direction X (+X, −X) than the image sensor 15 positioned at the primary imaging position. Therefore, in the subsequent description, the above case is assumed, and a description will be made of a case in which the light blocking members 210 and 220 and the lens array 12 are assembled so as to be shifted in the arrangement direction X by a distance corresponding to "10%" of the lens pitch.

Next, in the CISM of the embodiment and the comparative example, the imaging state of the optical image when the document P is read shown in FIG. 3 will be described. The CISM of the comparative example has angles of rotation θ1 and θ2 of the through holes 211 and 221 in the light blocking members 210 and 220 shown in FIGS. 14A and 14B and FIGS. 15A and 15B of "0 degrees". In the subsequent description, in order to distinguish a case in which the light blocking members 210 and 220 and the lens array 12 are assembled so that the centers of the through holes 211 and 221 and the centers of the lenses 11 match in the optical axis direction Z and a case in which this is not the case, the former case will also be referred to as a case which the centers match in the optical axis direction Z, and the latter case will also be referred to as a case in which the centers do not match in the optical axis direction Z.

As shown in FIG. 16, according to the imaging state of the CISM of the comparative example, the brightness at a position in a range from "−0.6 mm" to "0.6 mm" with the reference position CP as a center is higher than other positions, and the same position is indicated by the color white. Meanwhile, at a position in a range less than "−0.6 mm" and a position in a range larger than "0.6 mm" with the reference position CP as a center, the brightness becomes "0 (zero)" or "0 (zero)" or more, and the same position is indicated by black, or a color brighter than black. That is, in a range in which the brightness should primarily be "0 (zero)" such as the position shown by the solid line arrow in FIG. 16, there are cases of the brightness being "0 (zero)" or more. Here, calculating the proportion of the maximum value (brightness of position indicated by solid line arrow in FIG. 16) of the brightness in a range that should be a primarily black background part with the average value of the brightness in a range that should be a primarily white background part centered on the reference position CP as a reference yields "1.65%". The range that should be a primarily white background part corresponds to the width of the white, band-like lines in the direction in which the dotted and dashed line extends in the document P shown in FIG. 3.

Figure 17:
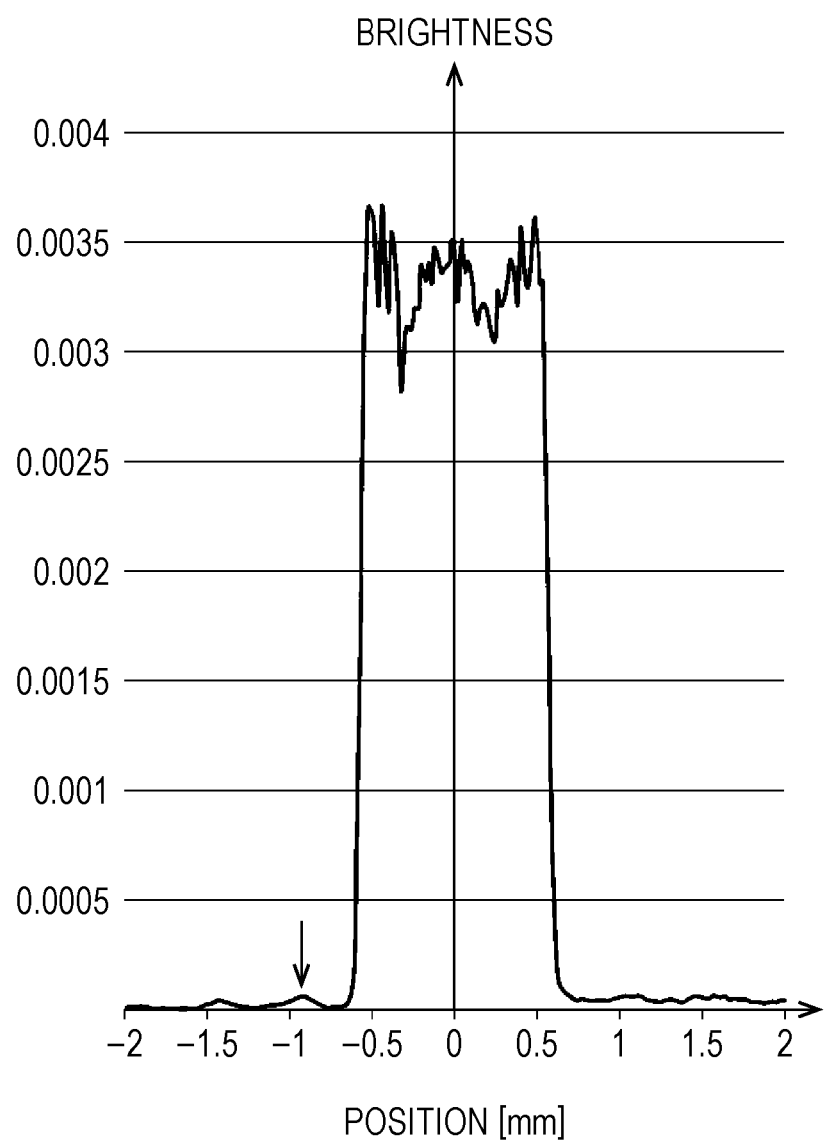
FIG. 17 is a graph showing the light receiving state using the CISM of the sixth embodiment.

In contrast, as shown in FIG. 17, according to the imaging state of the CISM of the embodiment, the brightness at a position in a range from "−0.6 mm" to "0.6 mm" with the reference position CP as a center is higher than other positions, and the same position is indicated by the color white. Meanwhile, at a position in a range less than "−0.6 mm" and a position in a range larger than "0.6 mm" with the reference position CP as a center, the brightness becomes "0 (zero)" or "0 (zero)" or more, and the same position is indicated by black, or a color brighter than black. Here, calculating the proportion of the maximum value (brightness of position indicated by solid line arrow in FIG. 17) of the brightness in a range that should be a primarily black background part with the average value of the brightness in a range that should be a primarily white background part centered on the reference position CP as a reference yields "1.39%".

Accordingly, by the CISM of the embodiment, because the proportion becomes small, reading the black background part of the document P as black is possible, and blurry parts in the imaged optical image do not easily occur, compared to the CISM of the comparative example. This is in order that, by making the angles of rotation θ1 and θ2 of the through holes 211 and 221 of the light blocking members 210 and 220 "10 degrees", the light reflected by the reflection surfaces 213 and 223 intersecting the sub-scanning direction Y of the through holes 211 and 221 of the light blocking members 210 and 220 becomes incident on a position shifted further in the sub-scanning direction Y (+Y, −Y) than the image sensor 15. That is, light reflected by the reflection surfaces 213 and 223 of the through holes 211 and 221 of the light blocking members 210 and 220 is suppressed from being incident on the imaging element positioned further in the arrangement direction X (+X, −X) than the imaging element of the image sensor 15 at the primary imaging position.

Next, with reference to FIG. 18, the relationship between the angles of rotation θ1 and θ2 of the through holes 211 and 221 of the light blocking members 210 and 220 and the imaging state of the optical image when the document P shown in FIG. 3 is read will be described.

Figure 18:
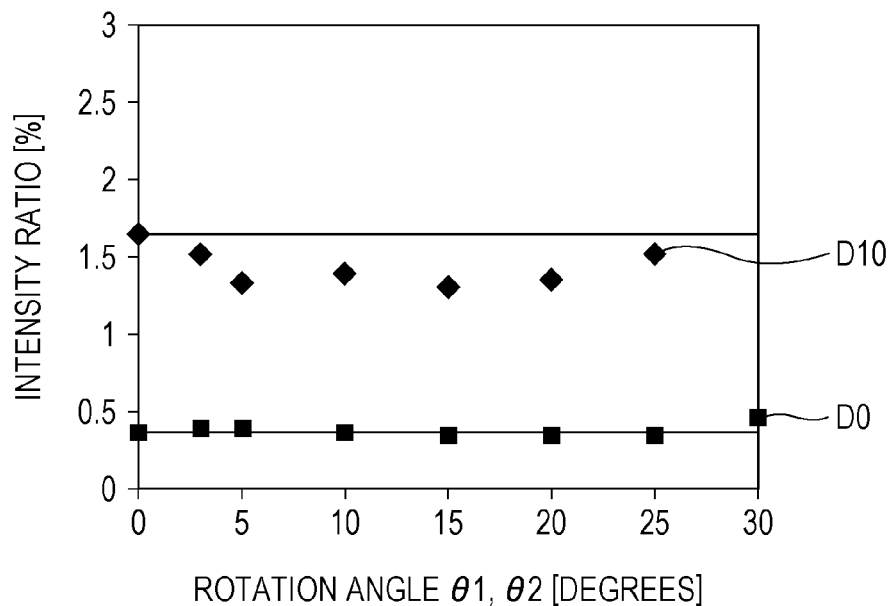
FIG. 18 is a graph showing the intensity ratio of the brightness with respect to the angle of rotation of the through hole.

FIG. 18 shows the intensity ratio in a case in which the angle of rotation θ1 of the first through hole 211 in the first light blocking member 210 and the angle of rotation θ2 of the second through hole 221 in the second light blocking member 220 are changed from "0 degrees" to "30 degrees". The intensity ratio is the proportion of the maximum value of the brightness in a range that should be a primarily black background part with the average value of the brightness in a range that should be a primarily white background part as a reference. That is, it can be said that the smaller the intensity ratio becomes, the more correctly it is possible to image the optical image of the document on the imaging surface.

FIG. 18 shows the intensity ratio between a case D0 in which the centers match in the optical axis direction Z and a case D10 in which the centers do not match in the optical axis direction Z. The case D10 in which the centers do not match in the optical axis direction Z is a case in which the centers of the through holes 211 and 221 and the centers of the lenses 11 are shifted in the arrangement direction X by a distance corresponding to "10%" of the lens pitch.

As shown in FIG. 18, the intensity ratio in a case D0 in which the centers match in the optical axis direction Z becomes smaller compared to a case D10 in which the centers do not match in the optical axis direction Z. That is, it can be said that as the light blocking members 210 and 220 and the lens array 12 are assembled such that the centers of the through holes 211 and 221 and the centers of the lenses 11 more closely match, the smaller the intensity ratio, and the higher the light receiving precision of the CISM become.

In the case D0 in which the centers match in the optical axis direction Z, the intensity ratio of a case in which the angles of rotation θ1 and θ2 are "3 degrees" or more and less than "10 degrees" and a case in which the angles of rotation θ1 and θ2 are "0 degrees" is substantially the same. The intensity ratio in a case in which the angles of rotation θ1 and θ2 are "10 degrees" or more and "25 degrees" or less becomes smaller than a case in which the angles of rotation θ1 and θ2 are "0 degrees". The intensity ratio in a case in which the angles of rotation θ1 and θ2 are "30 degrees" becomes greater than a case in which the angles of rotation θ1 and θ2 are "0 degrees". Accordingly, although the intensity ratio does not become uniformly smaller as the angles of rotation θ1 and θ2 increase in the case D0 in which the centers match in the optical axis direction Z, the intensity ratio decreases in the specified range of the angles of rotation θ1 and θ2.

Meanwhile, in the case D10 in which the centers do not match in the optical axis direction Z, the intensity ratio becomes smaller in a case in which the angles of rotation θ1 and θ2 are "3 degrees" or more and "25 degrees" or less than in a case in which the angles of rotation θ1 and θ2 are "0 degrees". Although not shown in FIG. 18, the intensity ratio in a case in which the angles of rotation θ1 and θ2 are "30 degrees" becomes larger than in a case in which the angles of rotation θ1 and θ2 are "0 degrees". The intensity ratio in a case in which the angles of rotation θ1 and θ2 are "30 degrees" is "4.28%". Accordingly, by making the angles of rotation θ1 and θ2 greater than "0 degrees" in the case D10 in which the centers do not match in the optical axis direction Z, even though there is an upper limit value, the intensity ratio decreases.

Thus, even in the case D0 in which the centers match in the optical axis direction Z or in a case D10 in which the centers do not match in the optical axis direction Z, it is possible to reduce the intensity ratio by providing the angles of rotation θ1 and θ2 of the through holes 211 and 221 in the light blocking member 210 and 220. Specifically, it is preferable that the angles of rotation θ1 and θ2 of the through holes 211 and 221 in the light blocking members 210 and 220 be "3 degrees" or more and "25 degrees" or less, and more preferably "5 degrees" or more and "20 degrees" or less.

Figure 19:
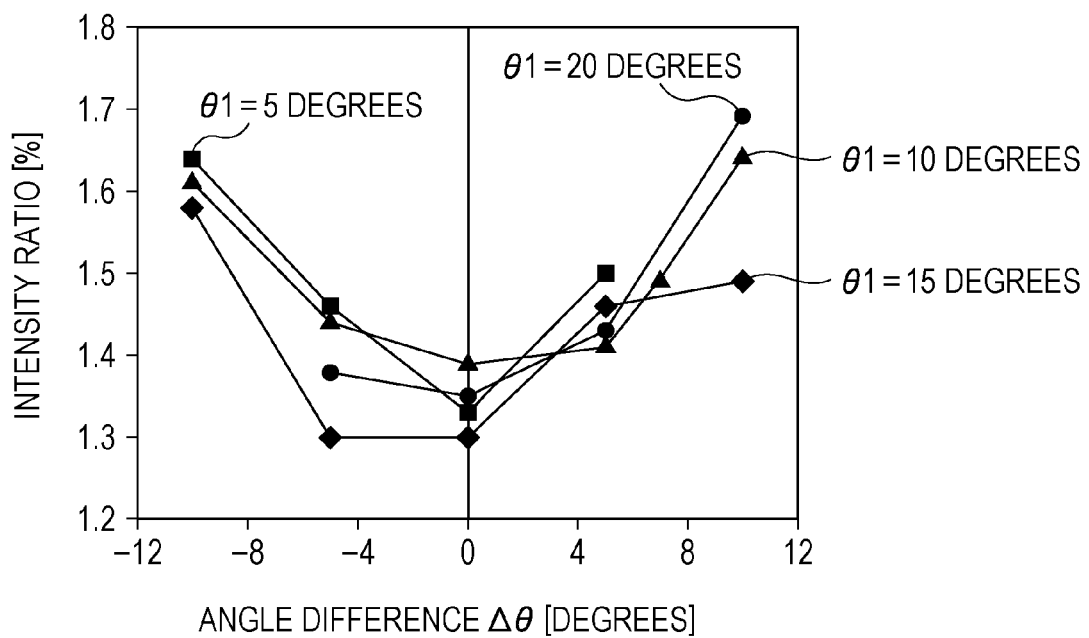
FIG. 19 is a graph showing the intensity ratio of the brightness with respect to the angle difference of the angle of rotation of the through hole in the first light blocking member and the second light blocking member.

The relationship between angle difference Δθ (θ1−θ2) that is the value of the angle of rotation θ2 of the second through holes 221 of the second light blocking member 220 subtracted from the angle of rotation θ1 of the first through holes 211 of the first light blocking member 210 and the imaging state of the optical image when the document P shown in FIG. 3 is read will be described with reference to FIG. 19. FIG. 19 shows the intensity ratio with respect to the angle difference Δθ in a case in which the angle of rotation θ1 of the first through holes 211 of the first light blocking member 210 is set to "5 degrees", "10 degrees", "15 degrees", and "20 degrees". The intensity ratio shown in FIG. 19 is the intensity ratio in a case in which the centers do not match in the optical axis direction Z, that is, a case in which the centers of the through holes 211 and 221 and the centers of the lenses 11 are shifted in the arrangement direction X by a distance corresponding to "10%" of the lens pitch.

As shown in FIG. 19, even in a case in which the angle of rotation θ1 of the first through hole 211 is any angle, the intensity ratio is smaller in a case in which the absolute value of the angle difference Δθ is small than in a case in which the absolute value of the same angle difference Δθ is large. In other words, even in a case in which the angle of rotation θ1 of the first through hole 211 is any angle, the larger the angle difference Δθ is than "0 degrees", that is the larger the angle of rotation θ1 of the first through hole 211 is than the angle of rotation θ2 of the second through hole 221, the larger the intensity difference. Meanwhile, the smaller the angle difference Δθ is than "0 degrees", that is, the larger the angle of rotation θ2 of the second through hole 221 is than the angle of rotation θ1 of the first through hole 211, the larger the intensity difference.

Therefore, in a case in which the angle of rotation θ1 of the first through hole 211 is "5 degrees", the intensity ratio becomes smallest for a case in which the angle of rotation θ2 of the second through hole 221 is "5 degrees", and in a case in which the angle of rotation θ1 of the first through hole 211 is "10 degrees", the intensity ratio becomes smallest in a case in which the angle of rotation θ2 of the second through hole 221 is "10 degrees". The same applies to a case in which the angle of rotation θ1 of the first through hole 211 is "15 degrees" and a case in which angle of rotation θ1 of the first through hole 211 is "20 degrees".

Thus, even in cases in which the angle of rotation θ1 of the first through hole 211 is any angle, it is preferable that the angle difference Δθ be a value approaching "0 degrees". That is, it is preferable that the angle of rotation θ1 of the first through holes 211 of the first light blocking member 210 not diverge from the angle of rotation θ2 of the second through holes 221 of the second light blocking member 220. More specifically, since the intensity ratio is "1.65%" in a case in which both the angles of rotation θ1 and θ2 of the through holes 211 and 221 of the light blocking members 210 and 220, respectively, are "0 degrees", it is preferable that the angle difference Δθ of the angles of rotation be "−10 degrees" or more and "10 degrees" or less.

The appropriate range of the angles of rotation θ1 and θ2 of the through holes 211 and 221 and the appropriate range of the angle difference Δθ of the same angles of rotation θ1 and θ2 differ according to the size or shape of the through holes 211 and 221.

According to the sixth embodiment, the following effects can be obtained in addition to the effects (1) to (3) of the above-described first embodiment.

(4) It is possible to reduce the labor and costs for forming a reflection surface compared to a case of forming a plurality of reflection surfaces in the inner wall surfaces 212 and 222 of the through hole 211 and 221. For example, in a case of injection molding the light blocking members 210 and 220 in a die with a resin material, it is possible to improve the formability of the through holes 211 and 221, and improve the release characteristics from the die.

The embodiment may be modified as shown below.

Figure 20A:
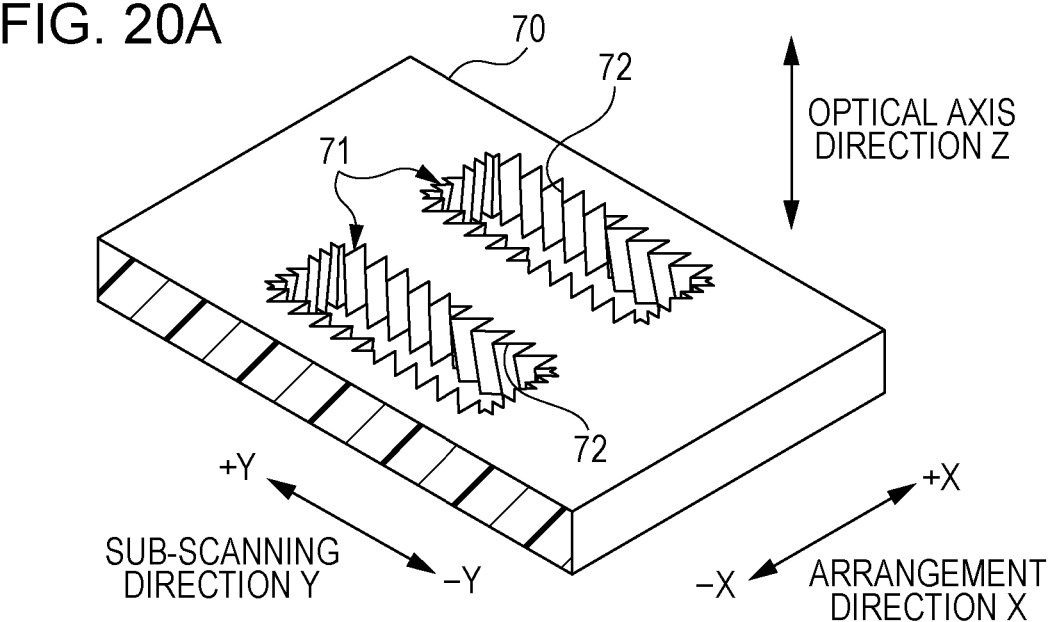
FIG. 20A is a perspective view showing the light blocking member of a modification example.
Figure 20B:
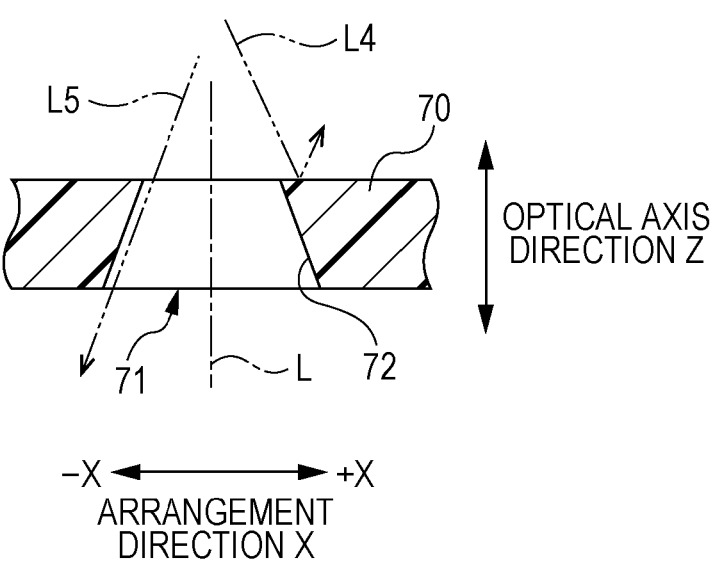
FIG. 20B is a simplified cross-sectional view of a partial configuration of the light blocking member of the modification example.

The area orthogonal to the optical axis direction Z of the through holes 20 of the light blocking members 13 and 14 may not be constant in the same optical axis direction Z. For example, as shown in FIGS. 20A and 20B, the area of the cross-section that is orthogonal to the optical axis direction Z in the through hole 71 of the light blocking member 70 may gradually increase toward the other end side. That is, the through holes 71 of the light blocking member 70 may be through holes formed with a taper shape that widens on the other end side in the optical axis direction Z. Accordingly, under the assumption that the volumes of the through holes 71 are the same, it is possible to block the majority of the light L4 that deviates from the optical axis L because the area of the cross-section of the through hole 71 on the one end side decreases, compared to a case in which the area of the cross-section of the through hole 71 is constant in the optical axis direction Z or a case in which the area of the cross-section of the through hole 71 gradually decreases toward the other end side. It becomes difficult for the light proceeding through the through hole 71 to be reflected by the inner wall surface 72 of the same through hole 71, compared to a case in which the area of the cross-section of the through hole 71 is constant in the optical axis direction Z. In other words, the light L5 proceeding along the inner wall surface 72 of the through hole 71 shown in FIG. 20B is easily reflected by the inner wall surface thereby becoming stray light, in a case in which the area of the cross-section of the through hole 71 is constant in the optical axis direction Z. Accordingly, by the light blocking member 70 shown in FIGS. 20A and 20B, it is possible to reduce the amount of light reflected by the inner wall surface 72 of the through hole 71.

Figure 21A:
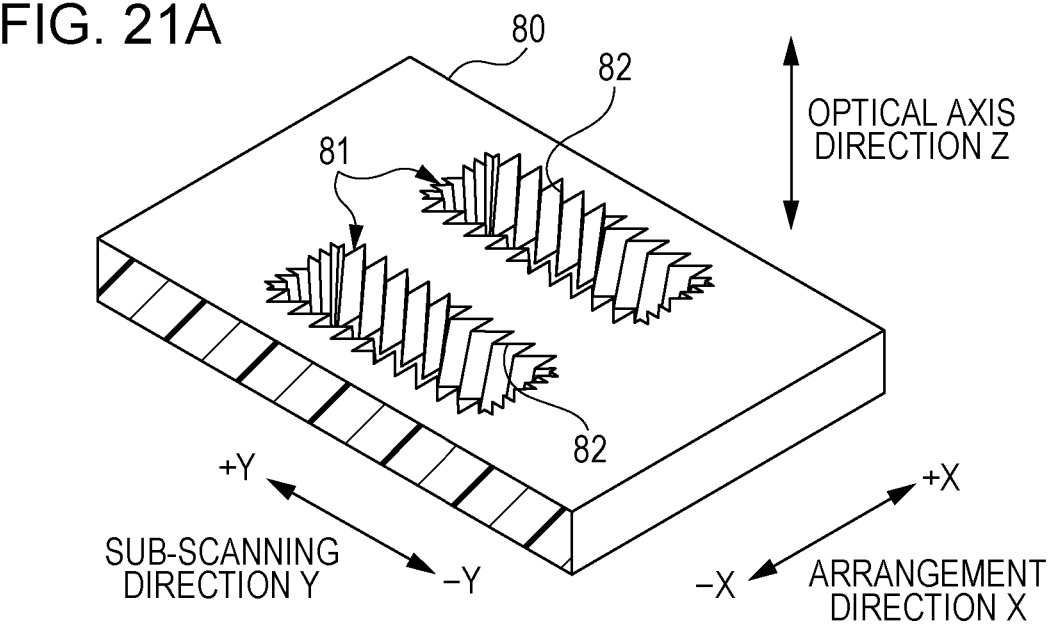
FIG. 21A is a perspective view showing the light blocking member of a modification example.
Figure 21B:
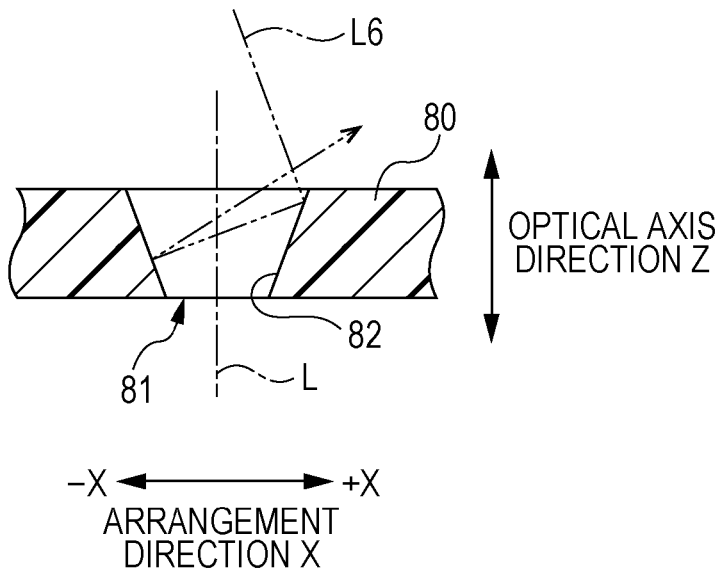
FIG. 21B is a simplified cross-sectional view of a partial configuration of the light blocking member of the modification example.

As shown in FIGS. 21A and 21B, the area of the cross-section orthogonal to the optical axis direction Z in the through hole 81 of the light blocking member 80 may gradually decrease toward the other end side. That is, the through holes 81 of the light blocking member 80 may be through holes formed in a taper shape that narrows on the other end side in the optical axis direction Z. Accordingly, as shown in FIG. 21B, the light L6 incident on the inner wall surface 82 of the through hole 81 from the one end side is easily reflected to the same one end side, compared to a case in which the area of the cross-section of the through hole 81 is constant in the optical axis direction Z. Therefore, it is possible to further suppress the contribution of light reflected by the inner wall surface 82 of the through hole 81 to image formation on the other end side of the lens array 12.

According to the light blocking members 70 and 80 shown in FIGS. 20A and 20B and FIGS. 21A and 21B, it is possible to smoothly separate the light blocking members 70 and 80 from the die when resin molding the same light blocking members 70 and 80 with a die, compared to a case in which the area of the cross-section of the through holes 71 and 81 is constant in the optical axis direction Z.

In the through holes 71 and 81 of the light blocking members 80 and 90 shown in FIGS. 20A and 20B and FIGS. 21A and 21B, if the inner wall surface that intersects the arrangement direction X is formed in a taper shape, the inner wall surface that intersects the sub-scanning direction Y may not be formed in a taper shape. If the inner wall surface that intersects the sub-scanning direction Y is formed in a taper shape, the inner wall surface that intersects the arrangement direction X may not be formed in a taper shape.

In the through holes 71 and 81 of the light blocking members 80 and 90 shown in FIGS. 20A and 20B and FIGS. 21A and 21B, the area of the through holes 71 and 81 may be changed in a step-wise manner toward the other end side in the optical axis direction Z.

Figure 22:
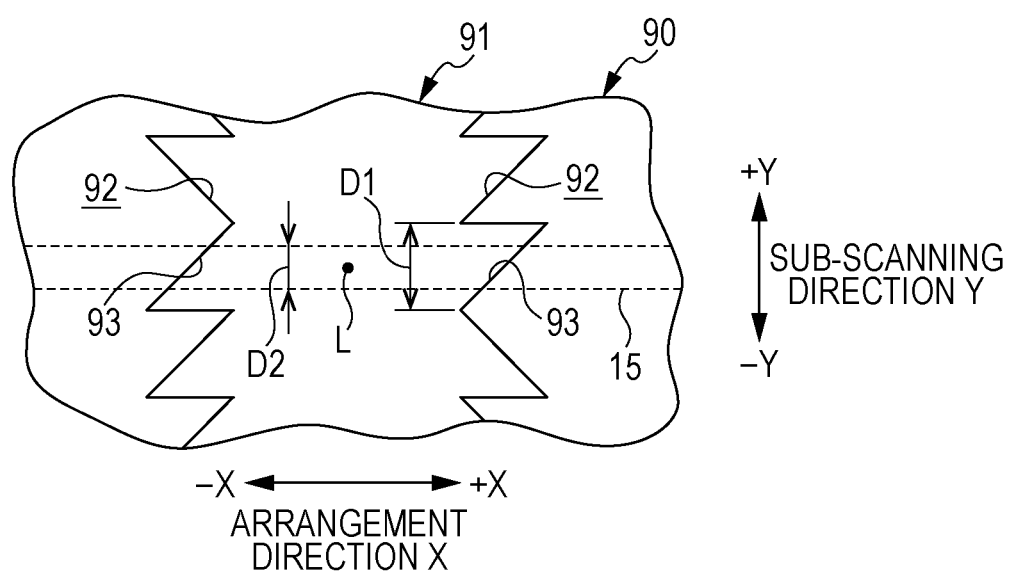
FIG. 22 is a plan view showing a through hole of the light blocking member of another modification example.

The inner wall surface 21 positioned in the arrangement direction X from the optical axis L in the through holes 20 of the light blocking members 13 and 14 may be made a reflection surface that intersects the sub-scanning direction Y. That is, as shown in FIG. 22, the inner wall surface 92 positioned in the arrangement direction X from the optical axis L in the through hole 91 of the light blocking member 90 may not be a convex inner wall surface formed by the reflection surface 22 and the reflection surface 23 as in the inner wall surfaces 21 of the through holes 20 of the light blocking members 13 and 14. In this case, it is preferable that the length dimension D1 in the sub-scanning direction Y of the reflection surface 93 of the inner wall surface 92 be longer than the length dimension D2 in the sub-scanning direction Y of the image sensor 15, that is, the length of one imaging element of the image sensor 15. In so doing, it is possible to suppress the light that proceeds in the arrangement direction X from the optical axis L from being reflected toward the optical axis L, and to suppress the reflected light from being received by the image sensor 15.

The inner wall surfaces 21, 41, 61, 212, and 222 of the through holes 20, 40, 60, 211, and 221 may be rough surfaces.

The numbers, sizes and angles with respect to the sub-scanning direction Y of the reflection surfaces 22 to 24, 42 to 44, 62, and 63 that the inner wall surfaces 21, 41 and 61 have may be arbitrarily changed.

One of the members of each pair of the first light blocking members and the second light blocking members 13, 14; 31, 32; 51, 52; and 210, 220 may not be provided.

In the CISM of the second embodiment and the CISM of the third embodiment, the first light blocking members 31 and 51 arranged on one end side of the lens array 12 may be the first light blocking member 101 of the comparative example. Alternatively, the second light blocking members 32 and 52 arranged on the one end side of the lens array 12 may be the second light blocking member 102 of the comparative example.

The through holes 20 of the light blocking members 13, 14, 31, 32, 51 and 52 may have a polygonal shape other than a rectangular shape as the cross-sectional shape thereof that intersects the optical axis L, and the shape may be a true circular shape or an elliptical shape.

The lens array 12 and a light blocking member may be further provided between the second light blocking member 14 and the light receiving portion 16. In this case, the light blocking member may be pinched by the lens array 12 in the optical axis direction Z.

In the sixth embodiment, the through holes 211 and 221 of the light blocking members 210 and 220 may not have a shape of a parallelogram in plan view thereof. For example, the through holes may have a rectangular shape, or may have an elliptical shape.

In the sixth embodiment, the reflection surfaces 213 and 223 that intersect the sub-scanning direction Y in the inner wall surfaces 212 and 222 that intersect the arrangement direction X may be curved surfaces that curve toward the inside, or may be curved surfaces that curve toward the outside. The reflection surfaces 215 and 225 that follow the arrangement direction X in the inner wall surfaces 214 and 224 that intersect a direction formed by the angles of rotation θ1 and θ2 with respect to the sub-scanning direction Y may be curved surfaces that curve toward the inside, or may be curved surfaces that curve toward the outside.

In the sixth embodiment, the cross-sectional area orthogonal to the optical axis direction Z of the first through hole 211 of the first light blocking member 210 may gradually increase toward the other end side, or may be uniform toward the other end side. The cross-sectional area orthogonal to the optical axis direction Z of the second through hole 221 of the second light blocking member 220 may gradually decrease toward the other end side, or may be uniform toward the other end side. The first through holes 211 and the second through holes 221 may have the same shape.

In the sixth embodiment, at least one of the angle of rotation θ1 of the through holes 211 in the first light blocking member 210 and the angle of rotation θ2 of the through holes 221 in the second light blocking member 220 may be a negative value.

The spaces or the like between the platen 17, the first light blocking member 13, the lens array 12, the second light blocking member 14, and the light receiving portion 16 that configure each CISM may be changed, as appropriate.

Each CISM (imaging optical element) may be applied to a composite printer, a transfer machine, a card reader, an authentication device, or the like besides an image scanner.

The entire disclosure of Japanese Patent Application No.: 2013-218100, filed Oct. 21, 2013 and 2014-068228, filed Mar. 28, 2014 are expressly incorporated by reference herein.

What is claimed is:

1. An image sensor module comprising:
    a lens array in which a plurality of lenses are arranged in row form so that optical axes become parallel to one another;
    a first light blocking member which is arranged on one end side of the lens array, and in which a plurality of first through holes which allow light to pass through is provided in row form in the same direction as a main scanning direction that is the arrangement direction of the lenses;
    a second light blocking member which is arranged on the other end side of the lens array, and in which a plurality of second through holes which allow light to pass through is provided in row form in the same direction as the main scanning direction that is the arrangement direction of the lenses; and
    a linear-type image sensor which receives light emitted from the lenses of the lens array via the second through holes of the second light blocking member,
    wherein each of the first through holes and the second through holes include inner wall surfaces that intersect the main scanning direction having a plurality of first reflection surfaces and second reflection surfaces in a serrated shape,
    wherein the first reflection surfaces are parallel to the main scanning direction, and
    wherein the second reflection surfaces are disposed at an angle relative to the main scanning direction and relative to a sub-scanning direction that is orthogonal to the main scanning direction.

2. The image sensor module according to claim 1, wherein the reflection surface is a smooth surface and a low reflection surface.

3. The image sensor module according to claim 1, wherein the area of the cross-section orthogonal to the optical axis direction of the through hole gradually increases toward the other end side.

4. The image sensor module according to claim 1, wherein the area of the cross-section orthogonal to the optical axis direction in the through hole gradually decreases toward the other end side.

5. The image sensor module according to claim 1, wherein light which reflected to the first reflection surface and the second reflection surface is entered at a position on the linear-type image sensor which is shifted from the optical axis of the lens of the lens array.

\* \* \* \* \*